(12) United States Patent
Hendershott

(10) Patent No.: US 9,739,354 B2
(45) Date of Patent: Aug. 22, 2017

(54) FLEXURE SUPPORT APPARATUS

(71) Applicant: Paul Hendershott, Boulder, CO (US)

(72) Inventor: Paul Hendershott, Boulder, CO (US)

(*) Notice: Subject to any disclaimer, the term of this patent is extended or adjusted under 35 U.S.C. 154(b) by 346 days.

(21) Appl. No.: 14/706,978

(22) Filed: May 8, 2015

(65) Prior Publication Data
US 2015/0247560 A1   Sep. 3, 2015

Related U.S. Application Data

(62) Division of application No. 13/671,562, filed on Nov. 8, 2012, now Pat. No. 9,057,425.

(60) Provisional application No. 61/557,143, filed on Nov. 8, 2011.

(51) Int. Cl.
| F16H 21/44 | (2006.01) |
|---|---|
| F16H 21/12 | (2006.01) |
| F16M 11/04 | (2006.01) |
| F16M 11/12 | (2006.01) |
| F16H 21/04 | (2006.01) |
| F16F 15/073 | (2006.01) |

(52) U.S. Cl.
CPC .......... *F16H 21/44* (2013.01); *F16F 15/073* (2013.01); *F16H 21/04* (2013.01); *F16H 21/12* (2013.01); *F16M 11/043* (2013.01); *F16M 11/12* (2013.01); *F16M 2200/04* (2013.01); *Y10T 74/18408* (2015.01); *Y10T 74/18992* (2015.01)

(58) Field of Classification Search
CPC .......... F16H 21/44; F16H 21/04; F16H 21/12; F16M 11/043
See application file for complete search history.

(56) References Cited

U.S. PATENT DOCUMENTS

| 4,638,830 | A | * | 1/1987 | Brown | ................ F15B 13/0438 137/83 |
|---|---|---|---|---|---|
| 5,351,490 | A | | 10/1994 | Ohishi et al. | |
| 5,522,214 | A | * | 6/1996 | Beckett | ................ F02G 1/0435 267/161 |
| 6,841,900 | B2 | * | 1/2005 | Corey | ....................... F16F 1/18 267/71 |
| 8,210,065 | B2 | * | 7/2012 | Howell | .................... G05G 1/02 29/401.1 |
| 8,424,562 | B2 | * | 4/2013 | Berglund | .............. F16K 15/144 137/512.15 |
| 9,057,425 | B2 | * | 6/2015 | Hendershott | ........... F16H 21/04 |

(Continued)

Primary Examiner — David M Fenstermacher
(74) Attorney, Agent, or Firm — Roger A. Jackson

(57) ABSTRACT

A flexure support apparatus for providing multiple axes support to reciprocating members for an energy conversion process includes a base having a sleeved opening disposed therethrough a central portion of the base and a plurality of apertures also disposed therethrough the base that are positioned outside of the sleeved opening, also included in a plurality of flexible finger assemblies that are positioned in an offset manner on opposing sides of the base. Further included is a pair of piston assemblies that are disposed within opposing ends of the sleeved opening being supported by the plurality of flexible finger assemblies, wherein the piston assemblies move in opposing and equal amounts in reciprocating movement within the sleeved opening being supported and controlled by the plurality of flexible finger assemblies, thus the pair of piston assemblies are able to do compressive work on a fluid within the sleeve without bearings or seals.

3 Claims, 15 Drawing Sheets

(56) References Cited

U.S. PATENT DOCUMENTS 9,157,497 B1* 10/2015 Magleby ................. F16F 1/027
2002/0050167 A1* 5/2002 Foote ..................... F16F 15/02
73/493

* cited by examiner

FLEXURE SUPPORT APPARATUS

RELATED PATENT APPLICATIONS

This application is a divisional of U.S. patent application Ser. No. 13/671,562 filed on Nov. 8, 2012 by Paul Hendershott of Boulder, Colo., US, as inventor that claims the benefit of U.S. provisional patent application Ser. No. 61/557,143 filed on Nov. 8, 2011 by Paul Hendershott of Boulder, Colo., US as inventor.

TECHNICAL FIELD

The present invention relates generally to an apparatus that is generally a linear motion/rotating flexure apparatus that facilitates duplicative motion in a linear mode, rotating mode, or both a combined linear and rotating mode. More specifically the flexure apparatus can be used to position or move a mirror, suspend a piston, serve as a dampener platform, or be used in any application that requires pointing or positioning at a slow or rapid pace; applications could include cooling system compressor, physical power conversion, and transmission.

BACKGROUND OF INVENTION

Motion control or movement limitation is important in kinetic assembly's, especially related to precise movement control such as allowing movement in one axis and significantly restricting movement in other axes. In one application, for a Stirling cryocooler as an example, a positive displacement piston type compressor is utilized and although this type of compressor is well known in its basic form, there are desired modifications to the piston type compressor for increasing reliability, reducing maintenance, and having better system operational characteristics. One particular focus would be upon the mechanical aspects of the piston compressor being in particular the bearings and seals, that are the necessary evils of creating the kinematic hardware to cause reciprocating motion upon a piston, wherein a shaft typically rotates in supports called bearings and the shaft has an offset crank that connects to a pivotally connected rod that moves the piston in a reciprocating manner having a contacting slip fit within a cylinder. Thus, the two basic additional items needed are the bearings that support the shaft and a fluid seal as between the piston and the cylinder; both the bearing and the seal operate dynamically, meaning they must work at the interface of relatively moving surfaces thus causing inevitable wear-equating to having replacement/maintenance issues. In addition, the bearings and seals have to have further support systems for their continuous use, as the bearings need lubrication-requiring another system to provide the bearing lubrication, further the seal also needs lubrication-sometimes it can be sacrificially included in the seal material, or the seal can fly on a fluid film based upon clearances and various configurations, or the lubrication from the bearing system can be used. In the interest of value engineering, elimination of parts and ancillary systems is ideal, while of course keeping the original function, thus in the present case elimination of the bearings and seals would be a significant step in improving the piston compressor, plus this would greatly expand the applications available to the piston compressor involving very high or low operating temperatures, or for example caustic or corrosive environments, or applications where regular maintenance access would be very difficult.

The key engineering concept would be to create the same function, being the reciprocating movement of the piston within the cylinder without the bearings or seals, by substituting other structure in their place that would not need lubrication, thus not having periodic wear, maintenance, and replacement needs. An approach is to eliminate dynamic surface interfaces, as it is these interfaces that need lubrication of some type and have wear, plus these interfaces increase the risk of failure via overheating or having surface to surface contact that can cause seizing, welding, and freezing together of the components at the dynamic interface, or excessive seal leakage or blowby of fluid in-between the piston and cylinder. Often it is difficult to reliably predict the threat of imminent dynamic surface interface failure due to the difficulty of getting instrumentation into the dynamic surface interface that could possibly warn of an impending failure of seizing, welding, and freezing together of the components at the dynamic interface, or excessive seal leakage or blowby of fluid in-between the piston and cylinder, so this often undesirably results in sudden and unexpected failure of the piston compressor. Thus, elimination of the contacting dynamic interface would be greatly desired, which would also eliminate the complete dependence on the critical dynamic fluid film that exists between the shaft and the bearing, and the seal and the cylinder, because it is this fluid film that can momentarily weaken or disappear unexpectedly causing the sudden seizing, welding, and freezing together of the components at the dynamic interface, or excessive seal leakage or blowby of fluid in-between the piston and cylinder.

One solution is to go to a flexure beam structure that can accommodate creating the reciprocating movement of the piston within the cylinder, thus eliminating the shaft, bearings, offset crank, and pivotally connected rod. However, there is still the issue of the seal that resides in the dynamic interface of the piston and cylinder, which through creative flexure beam design can add an extreme amount of rigidity in a lateral axis, i.e. perpendicular to the reciprocating movement such that a close but non-contacting clearance can be achieved radially or laterally as between the piston and the cylinder to eliminate the dynamic contacting seal, thus all but eliminating all dynamically contacting interfaces within the piston compressor. Thus would virtually do away with the wearing dynamic interfaces requiring some type of fluid lubricating interfaces, greatly simplifying the mechanical structural needs of the piston compressor, and further for the most part completely eliminating maintenance, the need for auxiliary support systems (such as lubrication), and significantly reduce the opportunity of a sudden unexpected failure in the form of seizing, welding, and freezing together of the components at the dynamic interface or excessive seal leakage or blowby of fluid in-between the piston and cylinder.

In looking at the prior art in this area, in U.S. Pat. No. 5,522,214 to Beckett, et al., disclosed a flat spiral spring flexure bearing support with particular application to Stirling machines, with the flat spiral spring flexure shown in a top or plan view in FIG. 2, wherein the outer periphery is fixed and the central aperture facilitates reciprocal movement through movement of the spiral cuts in the flexible flat element. In Beckett, the use of flexures in the form of flat spiral springs cut from sheet metal materials provides support for a coaxial nonrotating linear reciprocating single piston member in power conversion machinery, such as a Stirling cycle engine or a heat pump. Beckett permits operation of the reciprocating piston member within the cylinder with little or no rubbing contact or other wear mechanisms due to a claimed high radial stiffness of the flat spiral spring flexures.

For Beckett, the relatively movable members include one member having a hollow interior structure within which the flat spiral spring flexures are located, in a stacked fashion, see FIG. 3, wherein the flat spiral spring flexures permit limited axial movement between the interconnected members or piston and prevent adverse rotational movement and radial displacement from the desired coaxial positions of the piston relative to the cylinder. Beckett requires multiple "stacking" of the flat spiral spring flexures as shown in FIG. 3, to achieve high radial stiffness and high anti-rotation rigidity, however sacrificing axial piston movement flexibility by essentially combining multiple springs in parallel wherein the spring rate "K" factor increases. Other issues with Beckett would include stress risers at the spiral cuts themselves which would be subject to fatigue failure problems and bearing metal to metal wear as between the flat sides of the adjacent flat spiral spring flexures, further on the outer and inner fixed peripheral attachment annulus area of the flat spiral spring stress concentrations can occur due to a high number of repetitive deflective stress cycles at the attachment annulus area. Also, Beckett, only provides for a single piston within a cylinder which can lead to imbalances and vibration in the entire assembly.

Continuing in the prior art, in U.S. Pat. No. 5,351,490 to Ohishi et al., disclosed is a piston displacer support means for a cryogenic refrigerator utilizing a plurality of flat piston suspension springs include a plurality of spiral slits to provide a plurality of spiral arms, see FIG. 3, that are deflectable as the piston is reciprocated within the compressor cylinder, see FIG. 1, being somewhat similar to Beckett. Ohishi also has a plurality of annular inner retainers that are secured to the piston and are adapted to sandwich the inner peripheral edges of the piston suspension springs. Further in Ohishi a plurality of annular outer retainers are secured to the compressor housing and include a plurality of projections extending inwardly from the outer ends of the spiral slits to sandwich the outer peripheral edges of the flat piston suspension springs. The novelty in Ohishi is in the stress reduction attachment annulus area at both the outer periphery and the inner periphery of the flat spiral slit plates, thus confirming the problem of flat spiral spring stress concentrations that occur due to a high number of repetitive deflective stress cycles at the attachment annulus area, potentially causing cracking and shearing failure of one of the flat spiral spring segments.

Ohishi has projections that reduce the local stress intensity upon the flat spiral spring segment and both the inner and outer periphery, the projections somewhat resemble an electrical cord having progressively thicker cord support when approaching the receptacle-thus a gradual distribution of stress that the cord/receptacle area would see, further a series of apertures are disposed in-between the inner and outer peripheries positioned at the junction of the spiral slits to eliminate sharp section transitions to also reduce stress concentration in the flat spiral spring segment. Other issues with Ohishi would include stress risers at the spiral cuts themselves which would be subject to fatigue failure problems, although Ohishi has addressed this issue with the apertures at the spiral cut junctions, however, there can still be problems along the body of the spiral cut itself for stress riser from fatigue, if the cuts are not smooth and even and also the bearing metal to metal wear as between the flat sides of the adjacent flat spiral spring flexures, although Ohishi has also taken steps to accommodate the outer and inner fixed peripheral attachment annulus area of the flat spiral spring stress concentrations via the use of the projections thus offsetting these stress concentrations that can occur due to a high number of repetitive deflective stress cycles at the attachment annulus area.

What is needed is a bearing/support flexure beam structure that can accommodate creating the reciprocating movement of the piston within the cylinder, thus eliminating the shaft, bearings, lubrication system, offset crank, and pivotally connected rod. Further in addition, the flexure beam structure needs to provide highly rigid rotational and lateral support of the piston reciprocating within the cylinder, to allow the piston to operate within the cylinder without the need for any surface contact for support, thus eliminating dynamic contacting interfaces resulting in the elimination of seals and bearings. Due to the previously identified problems with the prior art use of the flat spiral spring configuration, it would be highly desirable to not utilize this configuration, and instead use a flexure beam that eliminates the spiral cut stress problem, the spiral cut sharp corner junction stress problem and the inner and outer peripheries attachment stress riser problems of the flat spiral spring. Using a plurality of flexure beams with relatively large and consistently sized cross sections will eliminate highly cyclic fatigue induced stress risers, thus increasing the reliability and operational life of the flexure beam thus overcoming the previous problems with the prior art flat spiral spring arrangement identified in both Beckett and Ohishi.

SUMMARY OF INVENTION

Broadly, the present invention is a flexure support apparatus for providing multiple axes support to reciprocating members for an energy conversion process that includes a base having an outer periphery, a central portion, and an intermediate portion, the base also having a first side and a second side. Further the base has a sleeved opening disposed therethrough the central portion of the base having a first sleeve extension side and a second sleeve extension side, and a plurality of first and second side apertures are also disposed therethrough the base that are positioned in the intermediate portion of the base. Also included in the flexure support apparatus is a plurality of first and second side flexible finger assemblies that are positioned in an offset manner on their respective first and second sides of the base. Further included is a first and second side piston assemblies that are disposed within respective first and second side opposing ends of the sleeved opening being supported by the plurality of the first and second flexible finger assemblies, wherein the first and second piston assemblies move in opposing and equal amounts in reciprocating movement within the sleeved opening being supported and controlled by the plurality of flexible finger assemblies, thus the pair of piston assemblies are able to do compressive work on a fluid within the sleeve without bearings or seals.

These and other objects of the present invention will become more readily appreciated and understood from a consideration of the following detailed description of the exemplary embodiments of the present invention when taken together with the accompanying drawings, in which;

REFERENCE NUMBERS IN DRAWINGS

Figure 1:
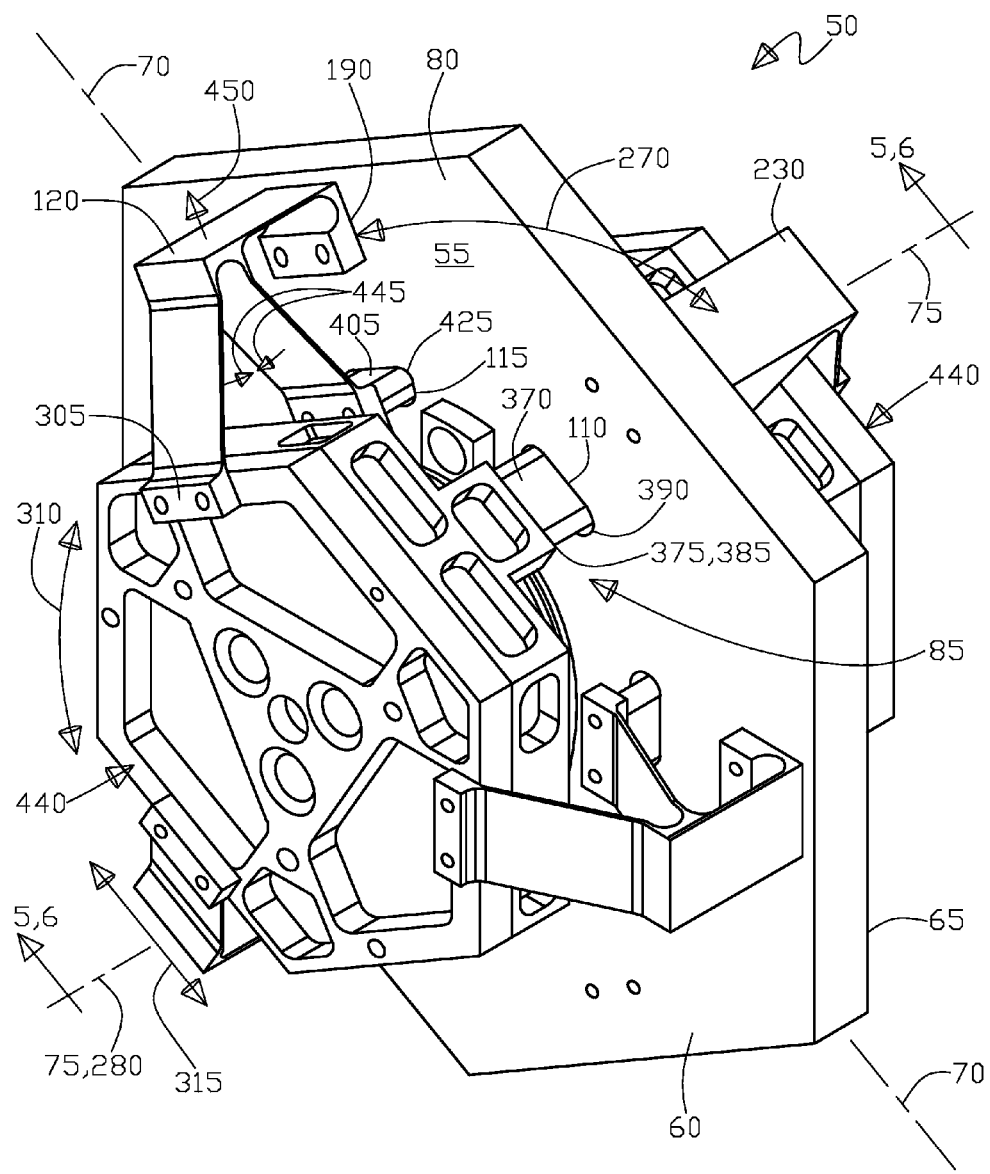
FIG. 1 shows a perspective view of the flexure support apparatus showing primarily the first side of the base with the planar axis of the base, the longitudinal axis of the base, the outer periphery portion of the base, the intermediate portion of the base, the first side apertures in the base, the first side flexible finger assemblies, the second side flexible finger assemblies, the offset manner of the first flexible arm assembly in relation to the second flexible arm assembly, the direction of the rigidity for the first side piston assembly about the first side lengthwise axis, rigidity of the first side piston assembly against movement in a plane parallel to the base planar axis, the first side legs freely proceeding therethrough the first side aperture, and the imparting of force movement into the first or second side support portions.

50 Flexure support apparatus
55 Base
60 First side of base 55
65 Second side of base 55
70 Planar axis of base 55
75 Longitudinal axis of base 55
80 Outer periphery portion of base 55
85 Intermediate portion of base 55
90 Central portion of base 55
95 Sleeved opening of base 55
100 First side sleeve extension
105 Second side sleeve extension
110 First side aperture of base 55
115 Second side apertures of base 55
120 First side flexible finger assemblies
125 First side flexible tines
130 First side primary free end of tines 125
135 First side secondary free end of tines 125
140 First side common origin
145 Cantilever fashion of first side tines 125
150 Cross section of tine 125, 235
155 Larger dimension of tine 125, 235
160 Large plane of tine 125, 235
165 Smaller dimension of tine 125, 235
170 Small plane of tine 125, 235
175 High tine 125, 235 flexibility in movement parallel to the longitudinal axis 75
180 High tine 125, 235 rigidity in movement parallel to planar axis 70
185 First side flexible arm
190 Affixed to base 55 at the outer periphery portion 80 of first side flexible arm 185
195 Cross sections of arm 185, 260
200 Larger dimension of arm 185, 260
205 Large plane of arm 185, 260
210 Arm dimension that is smaller than the larger arm 185, 260 dimension 200
215 Small plane of arm 185, 260
220 High flexibility in arm 185, 260 movement parallel to the planar axis 70 between the central portion 90 and the outer periphery portion 80
225 High rigidity in arm 185, 260 movement parallel to the planar axis 70 and about the longitudinal axis 75
230 Second side flexible finger assemblies
235 Second side flexible tines
240 Second side primary free end of tines 235
245 Second side secondary free end of tines 235
250 Second side common origin
255 Cantilever fashion of second side tines 235
260 Second side flexible arm
265 Affixed to base 55 of second side flexible arm 260
270 Offset manner of first flexible arm 185 in relation to second side flexible arm 260 at outer periphery 80 of base 55 attachment 190, 265
275 First side piston assembly
280 First side lengthwise axis of first side piston assembly 275
285 First side work portion of first side piston assembly 275
290 First side support portion of first side piston assembly 275
300 First side slip fit clearance engagement
305 First side support portion 290 is affixed to the first side primary free ends 130
310 Rigidity of the first side piston assembly 275 about the first side lengthwise axis 280
315 Rigidity of the first side piston assembly 275 against movement in a plane parallel to the planar axis 70
320 Reciprocative movement within the first side sleeve extension 100
325 Second side piston assembly 330 Second side lengthwise axis of second side piston assembly 325
335 Second side work portion of second side piston assembly 325
340 Second side support portion of second side piston assembly 325
345 Second side slip fit clearance engagement
350 Second side support portion 340 is affixed to the second side primary free ends 240
355 Rigidity of the second side piston assembly 325 about the second side lengthwise axis 330
360 Rigidity of the second side piston assembly 325 against movement in a plane parallel to the planar axis 70
365 Reciprocative movement within the second side sleeve extension 105
370 First side legs
375 Proximal end portion of first side leg 370
380 Distal end portion of first side leg 370
385 Affixing of first side leg proximal end portion 375 to first side support portion 290
390 First leg 370 extending freely therethrough the first side aperture 110
395 Affixing of first side leg distal end portion 380 to second side secondary free end 245
400 Dimension extending beyond of first side leg distal end portion 380 to first side work end portion 285 of the first side piston assembly 275
405 Second side legs
410 Proximal end portion of second side leg 405
415 Distal end portion of second side leg 405
420 Affixing of second side leg proximal end portion 410 to second side support portion 340
425 Second leg 405 extending freely therethrough the second side aperture 115
430 Affixing of second side leg distal end portion 415 to first side secondary free end 135
435 Dimension extending beyond of second side leg distal end portion 415 to second side work end portion 335 of the second side piston assembly 325
440 Imparting of force movement into either first 290 or second 340 side support portions
445 Moving together of first side primary free ends 130 and first side secondary free ends 135
450 First common origin 140 moving toward outer periphery 80
455 Moving together of second side primary free ends 240 and second side secondary free ends 245
460 Second common origin 250 moving toward outer periphery 80
465 First 275 and second 325 piston assemblies moving towards 320, 365 or apart 320,
365 from one another in unison in opposing reciprocative movement
470 Applying of compressive work energy 320, 365 to a fluid within the sleeve 95
600 Linear rotary motion translating apparatus
605 Driver first motion machine
610 Driven second motion machine
615 Core structure
620 First side of core structure 615
625 Second side of core structure 615
626 Planar axis of the core structure 615
630 Long axis of the core structure 615
635 Central portion of the core structure 615
640 Branches extending from the central portion 635
645 Flexible fork assemblies
650 Flexible elements of the fork assemblies 645
655 Parallelogram formed from the flexible elements 650
660 Outer point A of the parallelogram 655
665 Outer point B of the parallelogram 655
670 Outer point C of the parallelogram 655
675 Outer point D of the parallelogram 655
680 Flexible extensions of the flexible fork assemblies 645
685 First side termination of the flexible extension 680
690 Second side termination of the flexible extension 680
695 High flexibility plane
700 High rigidity plane
705 Drive element plate
710 Driven element plate
715 Axial force
720 Equal and opposite movement
725 High rotational axis rigidity about the long axis 630
730 High lateral rigidity in a plane parallel to the planar axis 626

DETAILED DESCRIPTION

With initial reference to FIG. 1, shown is a perspective view of the flexure support apparatus 50 showing primarily the first side 60 of the base 55 with the planar axis 70 of the base 55, the longitudinal axis 75 of the base 55, the outer periphery portion 80 of the base 55, and the intermediate portion 85 of the base 55. Further shown in FIG. 1 is the first side apertures 110 in the base 55, the first side flexible finger assemblies 120, the second side flexible finger assemblies 230, and the offset manner 270 of the first flexible finger assembly 120 in relation to the second flexible finger assembly 230. Also, in FIG. 1 shown is the direction of the rigidity 310 for the first side piston assembly 275 about the first side lengthwise axis 280, rigidity 315 of the first side piston assembly 275 against movement in a plane parallel to the base planar axis 70, first side legs 370 freely proceeding therethrough 390 the first side aperture 110, and the imparting of force 440 movement into the first 290 or second 340 side support portions.

Figure 2:
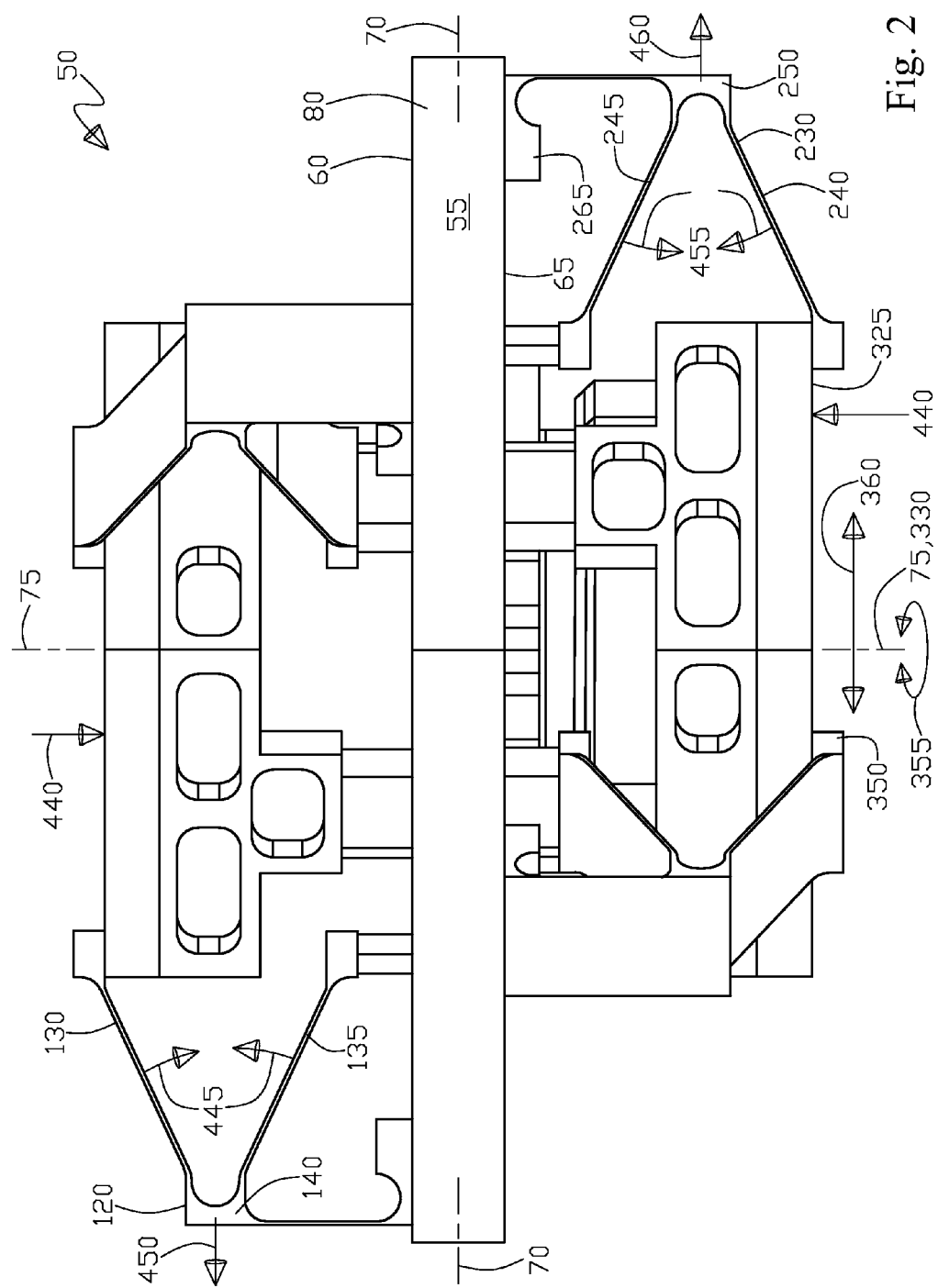
FIG. 2 shows a side elevation view of the flexure support apparatus, wherein both the first and second base sides are shown, with the base planar axis, the base longitudinal axis, the first and second side flexible finger assemblies, the imparting of force movement into the first or second side support portions, and the reactionary movement from the first and second side flexible finger assemblies moving together of the first and second sides primary free ends toward the secondary free ends, and the moving of the first and second common origins toward the outer periphery, plus the rigidity of the second side piston assembly about the second side lengthwise axis, and the rigidity of the second side piston assembly against movement in a plane parallel to the planar axis.
Figure 3:
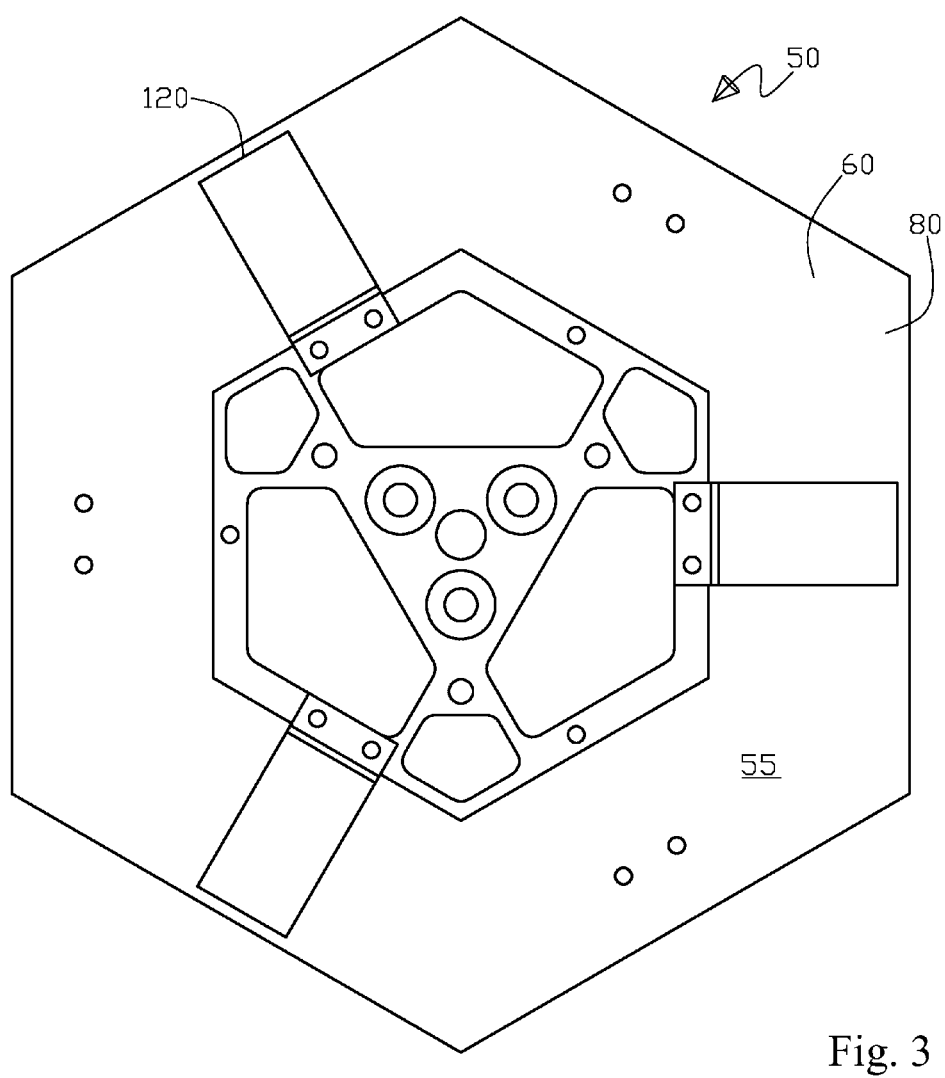
FIG. 3 shows a top view of the flexure support apparatus being in particular the first side of the base with the base outer periphery and the first side flexible finger assembly.

Continuing to FIG. 2 shown is a side elevation view of the flexure support apparatus 50, wherein both the first 60 and second 65 base sides are shown, with the base planar axis 70, the base longitudinal axis 75, the first 120 and second 230 side flexible finger assemblies, the imparting of force 440 movement into the first 290 or second 340 side support portions, and the reactionary movement from the first 120 and second 230 side flexible finger assemblies moving together of the first 130 and second 240 sides primary free ends movement toward 445, 455 the first 135 and second 245 secondary free ends. Further shown in FIG. 2 is the moving 450, 460 of the first 140 and second 250 common origins toward the outer periphery 80, plus the rigidity 355 of the second side piston assembly 325 about the second side lengthwise axis 330, and the rigidity 360 of the second side piston assembly 325 against movement in a plane parallel to the planar axis 70. Next, FIG. 3 shows a top view of the flexure support apparatus 50 being in particular the first side 60 of the base with the base outer periphery 80 and the first side flexible finger assembly 120.

Figure 4:
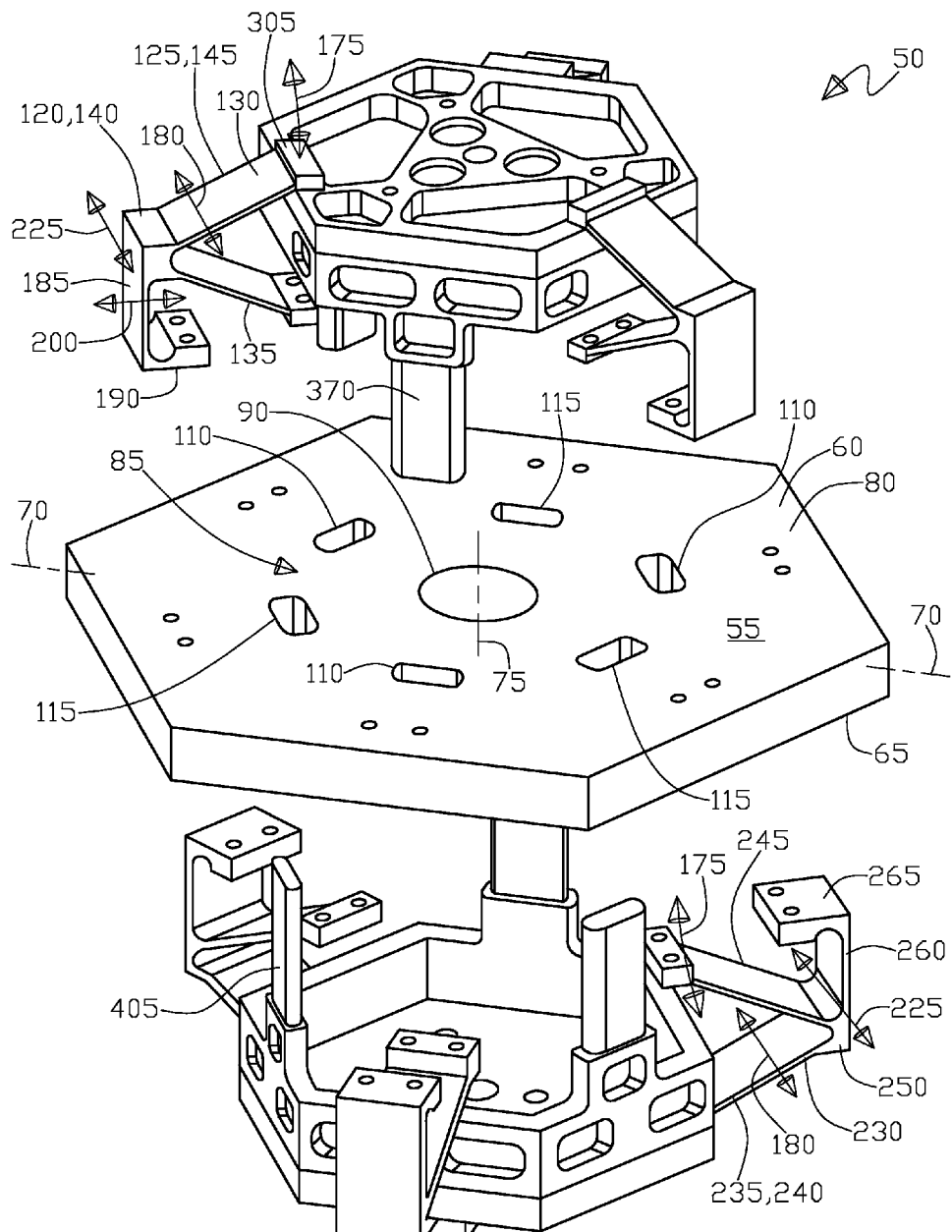
FIG. 4 shows an exploded perspective view of the flexure support apparatus with both the first and second sides of the base, the base planar axis, the base longitudinal axis, the first and second apertures, the first and second legs, and detail of the first side flexible finger assembly including the first side primary free end and the first side secondary free ends, the first origin, the first side arm, plus the tine flexibility and rigidity axes, and detail of the second side flexible finger assembly including the second side primary free end and the second side secondary free ends, the second origin, the second side arm, plus the tine flexibility and rigidity axes.

Next, FIG. 4 shows an exploded perspective view of the flexure support apparatus 50 with both the first 60 and second 65 sides of the base, the base planar axis 70, the base longitudinal axis 75, the first 110 and second 115 side apertures, the first 370 and second 405 legs, and detail of the first side flexible finger assembly 120 including the first side primary free end 130 and the first side secondary free ends 135, the first origin 140, the first side arm 185, plus the tine flexibility 175 and rigidity 180 axes, and detail of the second side flexible finger assembly 230 including the second side primary free end 240 and the second side secondary free ends 245, the second origin 250, the second side arm 260, plus the tine flexibility 175 and rigidity 180 axes.

Figure 5:
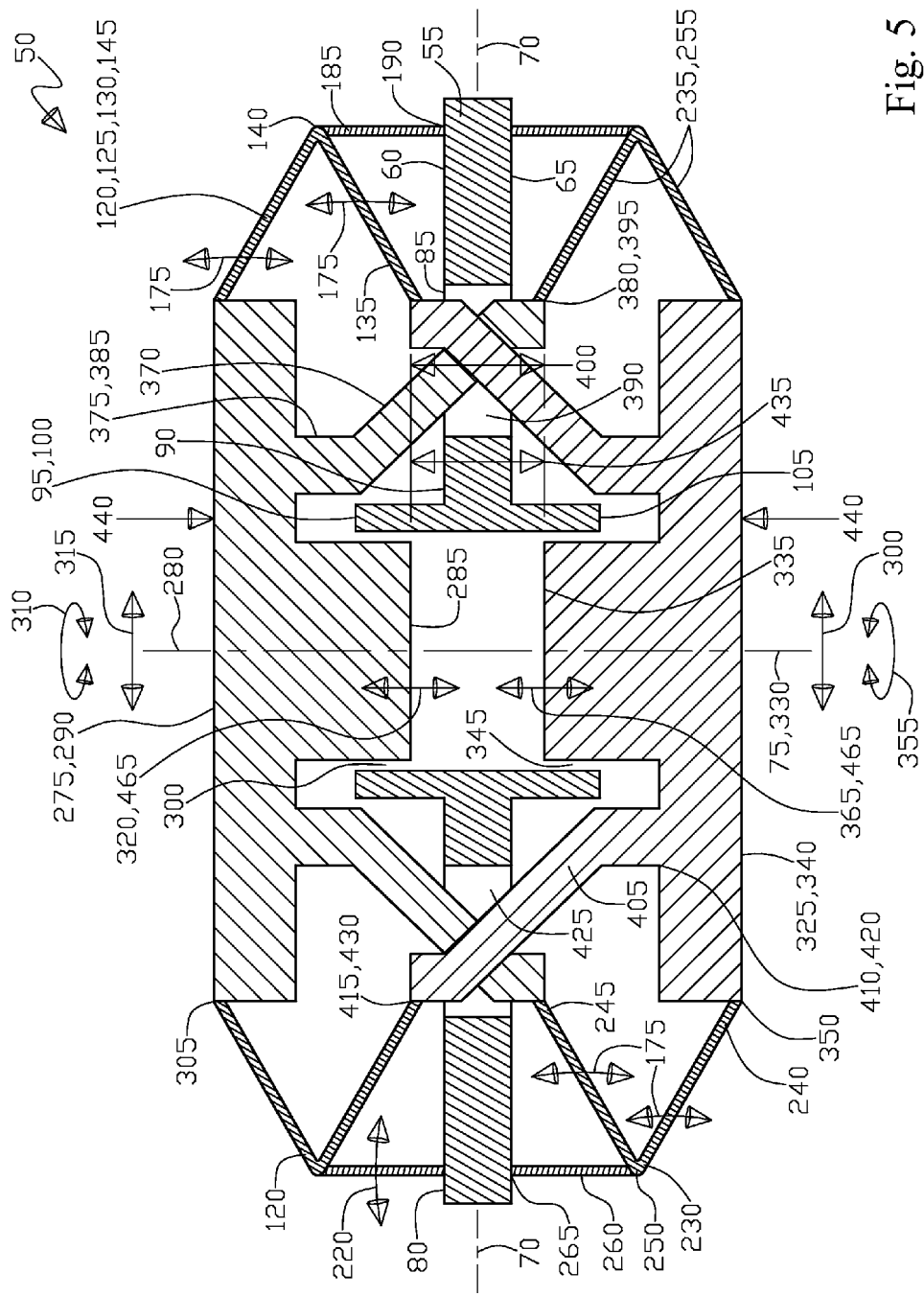
FIG. 5 shows a cross section 5-5—from FIG. 1, that details out the base with the outer periphery, intermediate portion, central portion, planar axis, and longitudinal axis and the first and second side apertures, plus the first and second piston assemblies in an open or spread apart operational state relationship with the first and second flexible finger assemblies, the first and second side legs, further in relation to the base with the first and second side apertures, the sleeve, the first and second side sleeve extensions, all in conjunction with the reciprocative movement of the first and second work end portions of the first and second piston assemblies, starting with the first side lengthwise axis, first side work portion, first side support portion, the first side slip fit clearance, the first side support portion affixed to the first side primary free ends, rigidity of the first piston assembly about the lengthwise axis, rigidity of the first side piston assembly against movement in a plane parallel to the planar axis, and then showing with the second side lengthwise axis, second side work portion, second side support portion, the second side slip fit clearance, the second side support portion affixed to the second side primary free ends, the rigidity of the second piston assembly about the lengthwise axis, the rigidity of the second side piston assembly against movement in a plane parallel to the planar axis, also the first side flexible tines, the first side primary free end of the tines, the first side secondary free end of the tines, first side common origin, cantilever fashion of the first tines, high first tine flexibility movement, first side flexible arm that is affixed to base outer periphery, further the also the second side flexible tines, the second side primary free end of the tines, the second side secondary free end of the tines, the second side common origin, the cantilever fashion of the second tines, the high second tine flexibility movement, and the second side flexible arm that is affixed to base outer periphery.

Further, FIG. 5 shows a cross section 5-5—from FIG. 1, that details out the base 55 with the outer periphery 80, the intermediate portion 85, the central portion 90, planar axis 70, and longitudinal axis 75 and the first 110 and second 115 side apertures, plus the first 275 and second 325 piston assemblies in an open or spread apart operational state relationship with the first 120 and second 230 flexible finger assemblies. Also shown in FIG. 5 is the first 370 and second 405 side legs, further in relation to the base 55 with the first 110 and second 115 side apertures, the sleeve 95, the first 100 and second 105 side sleeve extensions, all in conjunction with the reciprocative movement 320, 465 of the first 285 and second 335 work end portions of the first 275 and second 325 piston assemblies. Thus, in FIG. 5 starting with the first side lengthwise axis 280, first side work portion 285, first side support portion 290, the first side slip fit clearance 300, the first side support portion 290 affixed 305 to the first side primary free ends 130, rigidity 310 of the first piston assembly 275 about the lengthwise axis, rigidity 315 of the first side piston assembly 275 against movement in a plane parallel to the planar axis 70.

Further in FIG. 5, showing with the second side lengthwise axis 330, second side work portion 335, second side support portion 340, the second side slip fit clearance 345, the second side support portion 340 affixed 350 to the second side primary free ends 240, the rigidity 355 of the second piston assembly 325 about the lengthwise axis 330, the rigidity 360 of the second side piston assembly 325 against movement in a plane parallel to the planar axis 70. Also shown in FIG. 5, on the first side flexible tines 125, the first side primary free end of the tines 130, the first side secondary free end of the tines 135, the first side common origin 140, the cantilever fashion 145 of the first tines 125, the high first tine flexibility movement 175, first side flexible arm 185 that is affixed 190 to base outer periphery 80, further the second side flexible tines 235, the second side primary free end of the tines 240, the second side secondary free end of the tines 245, the second side common origin 250, the cantilever fashion 255 of the second tines, the high second tine flexibility movement 175, and the second side flexible arm 260 that is affixed 265 to the base outer periphery 80.

Figure 6:
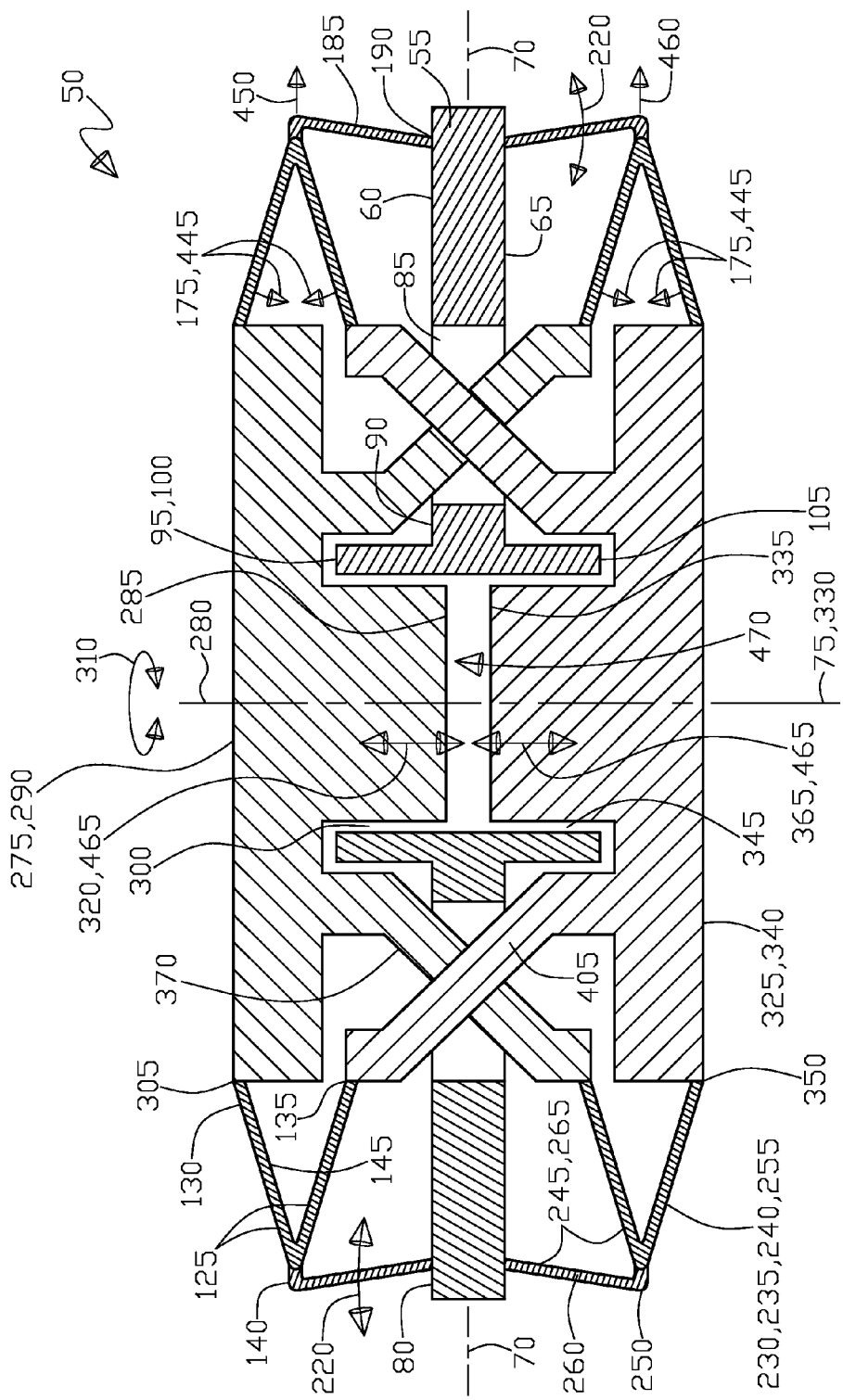
FIG. 6 shows a cross section 6-6—from FIG. 1, that details out the base with the outer periphery, intermediate portion, central portion, planar axis, and longitudinal axis and the first and second side apertures, plus the first and second piston assemblies in an closed or moving toward another operational state relationship with the first and second flexible finger assemblies, the first and second side legs, further in relation to the base with the first and second side apertures, the sleeve, the first and second side sleeve extensions, all in conjunction with the reciprocative movement of the first and second work end portions of the first and second piston assemblies, wherein the applying of compressive work energy to a fluid within the sleeve, starting with the first side lengthwise axis, the first side work portion, the first side support portion, the first side slip fit clearance, the first side support portion affixed to the first side primary free ends, the rigidity of the first piston assembly about the lengthwise axis, and then showing the second side lengthwise axis, the second side work portion, the second side support portion, the second side slip fit clearance, the second side support portion affixed to the second side primary free ends, also the first side flexible tines, the first side primary free end of the tines, the first side secondary free end of the tines, the first side common origin, cantilever fashion of the first tines, high first tine flexibility movement, the first side flexible arm that is affixed to base outer periphery, wherein the first side arm and origin have movement toward the outer periphery, further also the second side flexible tines, the second side primary free end of the tines, the second side secondary free end of the tines, the second side common origin, the cantilever fashion of the second tines, the high second tine flexibility movement, and the second side flexible arm that is affixed to base outer periphery, wherein the second side arm and origin have movement toward the outer periphery.

Continuing in FIG. 6 shown is a cross section 6-6 from FIG. 1, that details out the base 55 with the outer periphery 80, the intermediate portion 85, the central portion 90, planar axis 70, and longitudinal axis 75 and the first 110 and second 115 side apertures, plus the first 275 and second 325 piston assemblies in a closed or moving toward another operational state relationship with the first 120 and second 230 flexible finger assemblies, the first 370 and second 405 side legs, further in relation to the base 55 with the first 110 and second 115 side apertures. Further shown in FIG. 6 is the sleeve 95, the first 100 and second 105 side sleeve extensions, all in conjunction with the reciprocative movement 320, 465 of the first 285 and second 335 work end portions of the first 275 and second 325 piston assemblies, wherein the applying of compressive work energy 320, 365 to a fluid 470 within the sleeve 95, starting with the first side lengthwise axis 280, the first side work portion 285, the first side support portion 290, the first side slip fit clearance 300, the first side support portion 290 affixed 305 to the first side primary free ends 130.

Also shown in FIG. 6 is the rigidity 310 of the first piston assembly 275 about the lengthwise axis 280, and then showing with the second side lengthwise axis 330, the second side work portion 335, the second side support portion 340, the second side slip fit clearance 345, the second side support portion 340 affixed 350 to the second side primary free ends 240, also the first side flexible tines 125, the first side primary free end 130 of the tines 125, the first side secondary free end 135 of the tines 125, the first side common origin 140, cantilever fashion 145 of the first tines 125, high first tine flexibility movement 175, the first side flexible arm 185 that is affixed 190 to base outer periphery 80. Further in FIG. 6, the first side arm 185 and origin 140 have movement 220 toward the outer periphery 80, also for the second side flexible tines 235, the second side primary free end 240 of the tines 235, the second side secondary free end 245 of the tines 235, the second side common origin 250, the cantilever fashion 255 of the second tines 235, the high second tine flexibility movement 175, 455, and the second side flexible arm 260 that is affixed 265 to base outer periphery 80, wherein the second side arm 260 and origin 250 have movement 220 toward the outer periphery 80.

Figure 7:
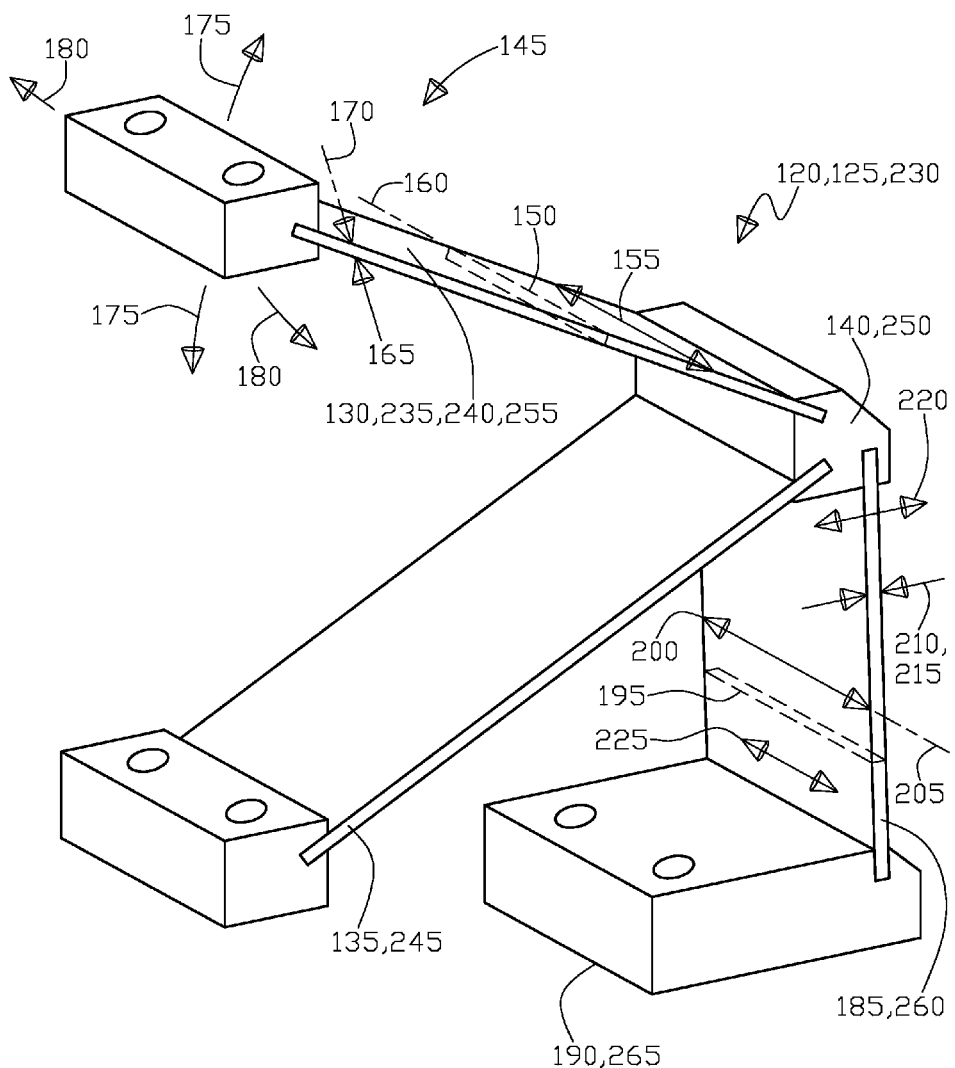
FIG. 7 shows a perspective view of what can be either the first or second side finger assemblies being isolated from the rest of the flexure support apparatus for clarity, the first and second side finger assemblies are identical except for positioning on either the first or second side of the base, the first side flexible finger assembly includes the first side flexible tines, the first side primary free end of the tines, the first side secondary free end of the tines, the first side common origin, the cantilever fashion of the first side tines, the cross section of the tines, the larger dimension of the tines, the large plane of the tine, the smaller dimension of the tine, the small plane of the tine, the high flexibility movement of the tine, the high rigidity against movement of the tine, the first side flexible arm, where the first side arm is affixed, the cross section of the arm, the larger dimension of the arm, the large plane of the arm, the arm dimension that is smaller than the larger arm dimension, the small plane of the arm, and the high flexibility in arm movement, and the high rigidity in arm movement, the second side flexible finger assembly includes the second side flexible tines, the second side primary free end of the tines, the second side secondary free end of the tines, the second side common origin, the cantilever fashion of the second side tines, the second side flexible arm, and where the second side arm is affixed.

Continuing, FIG. 7 shows a perspective view of what can be either the first 120 or second 230 side finger assemblies being isolated from the rest of the flexure support apparatus 50 (not shown) for clarity, wherein the first 120 and second 230 side finger assemblies are identical except for positioning on either the first 60 or second 65 side of the base 55, the first side flexible finger assembly 120 includes the first side flexible tines 125, the first side primary free end 130 of the tines 125, the first side secondary free end 135 of the tines 125, the first side common origin 140, the cantilever fashion 145 of the first side tines 125. Also shown in FIG. 7 is the cross section 150 of the tines 125, the larger dimension 155 of the tines 125, the large plane 160 of the tine 125, the smaller dimension 165 of the tine 125, the small plane 170 of the tine 125, high flexibility movement 175 of the tine 125, high rigidity against movement 180 of the tine 125, the first side flexible arm 185, where the first side arm 185 is affixed 190, cross section 195 of the arm 185, 260, the larger dimension 200 of the arm 185, 260, the large plane 205 of the arm 185, 260, the arm dimension that is smaller 210 than the larger arm dimension 200, the small plane 215 of the arm 185, 260, and the high flexibility in arm 185, 260 movement 220, and the high rigidity in arm 185, 260 movement 225. Also in FIG. 7 shown is the second side flexible finger assembly 230 that includes the second side flexible tines 235, the second side primary free end 240 of the tines 235, the second side secondary free end 245 of the tines 235, the second side common origin 250, the cantilever fashion 255 of the second side tines 235, the second side flexible arm 260, and where the second side arm 260 is affixed 265. The FIG. 7 tines 125, 235 and arms 185, 260 cross sectional attributes could also apply to the FIG. 13 flexible elements/extensions 650, 680.

Figure 8:
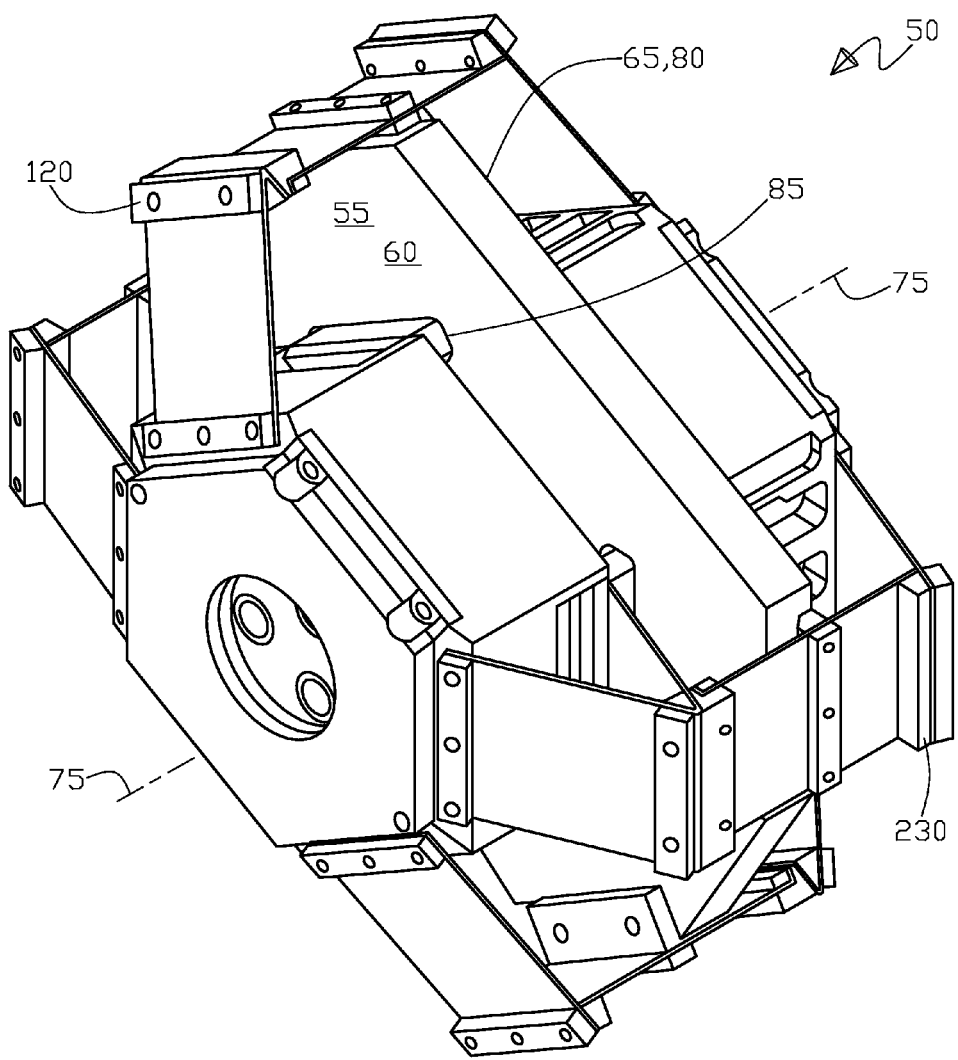
FIG. 8 shows a perspective view of the flexure support apparatus using four first and second side flexible finger assemblies on the base located at the outer periphery about the longitudinal axis.
Figure 9:
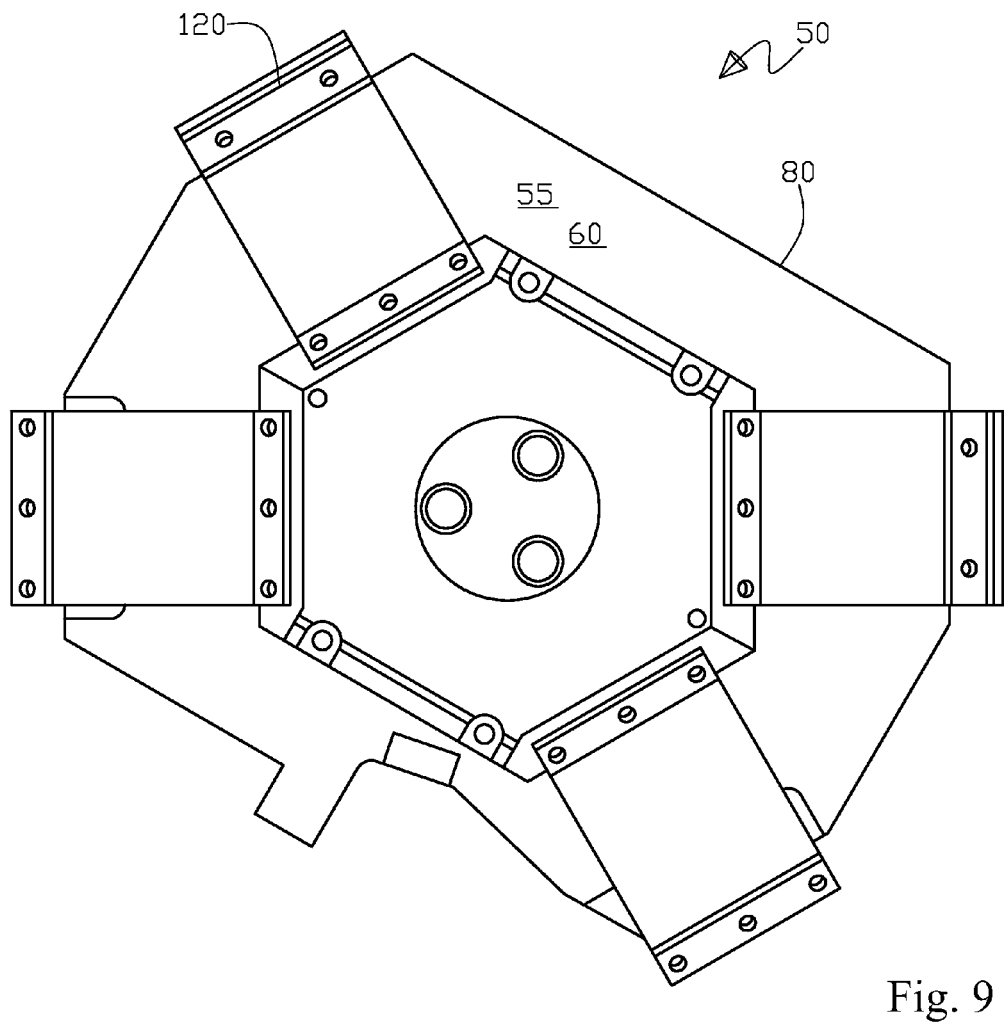
FIG. 9 shows a top view of the flexure support apparatus using four first and second side flexible finger assemblies on the base located at the outer periphery about the longitudinal axis.
Figure 10:
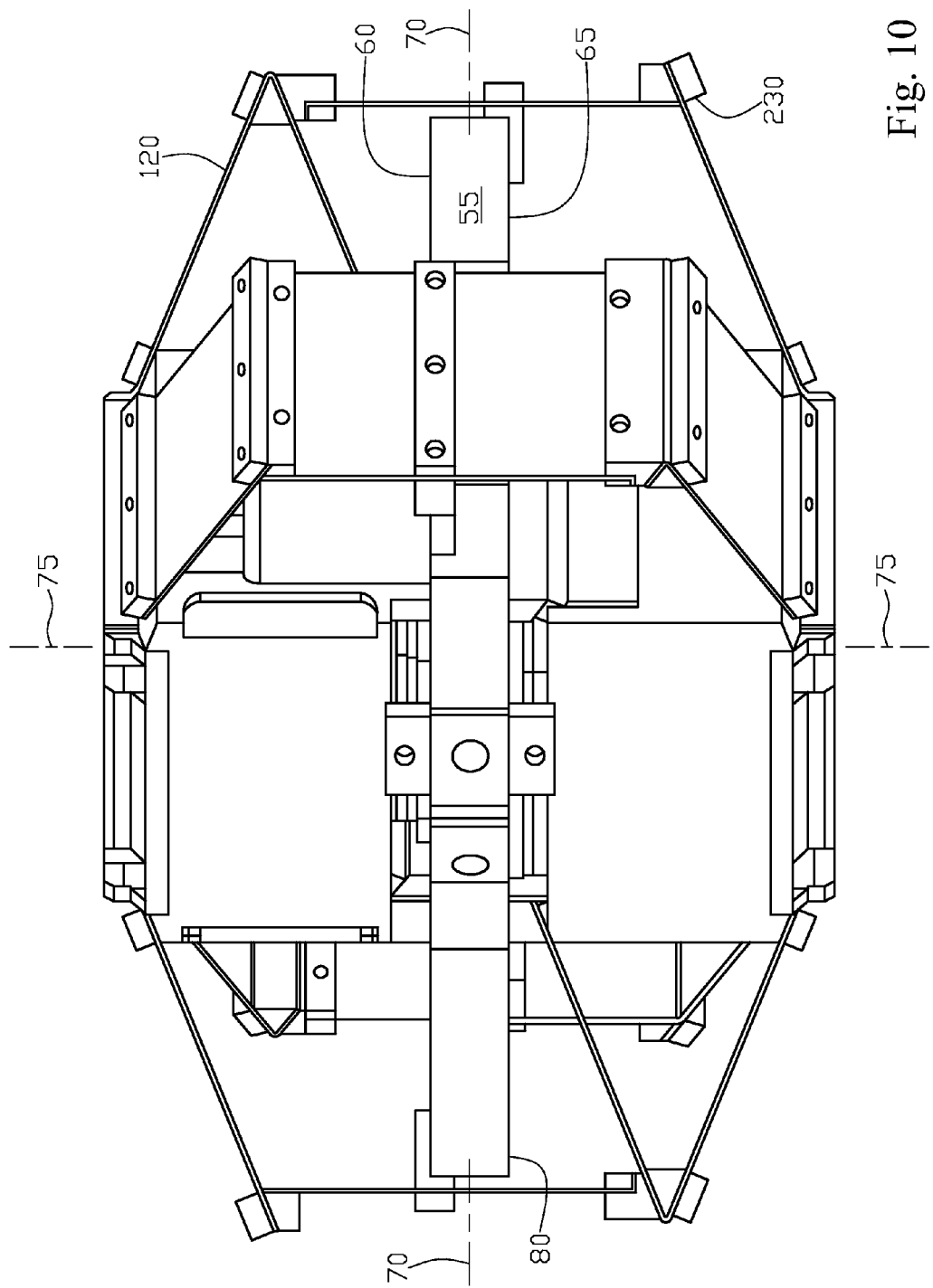
FIG. 10 shows a side elevation view of the flexure support apparatus using four first and second side flexible finger assemblies on the base located at the outer periphery about the longitudinal axis with the planar axis.

Next, FIG. 8 shows a perspective view of the flexure support apparatus 50 using four each of first 120 and second 230 side flexible finger assemblies on the base 55 located at the outer periphery 80 about the longitudinal axis 75. Further, FIG. 9 shows a top view of the flexure support apparatus 50 using four each of first 120 and second 230 side flexible finger assemblies on the base 55 located at the outer periphery 80 about the longitudinal axis 75. Next, FIG. 10 shows a side elevation view of the flexure support apparatus 50 using four each of first 120 and second 230 side flexible finger assemblies on the base 55 located at the outer periphery 80 about the longitudinal axis 75 with the planar axis 70 shown.

Figure 11:
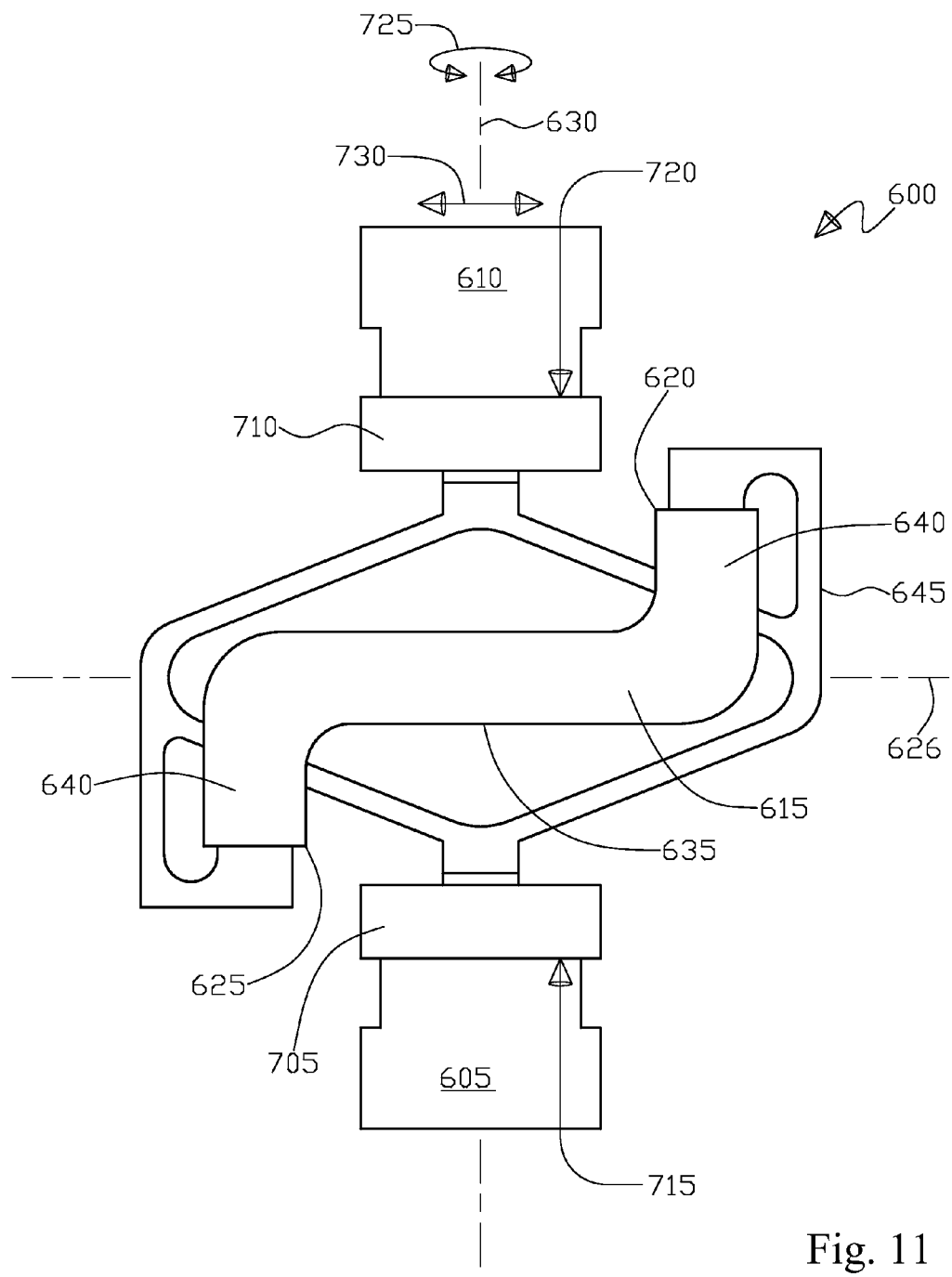
FIG. 11 shows a side elevation view of the linear motion translating apparatus including the driver first motion machine, the driven second motion machine, the core, the first side of the core, the second side of the core, the planar axis of the core, the long axis of the core, the central portion of the core, the branches, the flexible fork assemblies, the drive element plate, the driven element plate, the axial force, the equal and opposite movement, the high rotational rigidity about the long axis, and the high lateral rigidity in a plane parallel to the planar axis.
Figure 12:
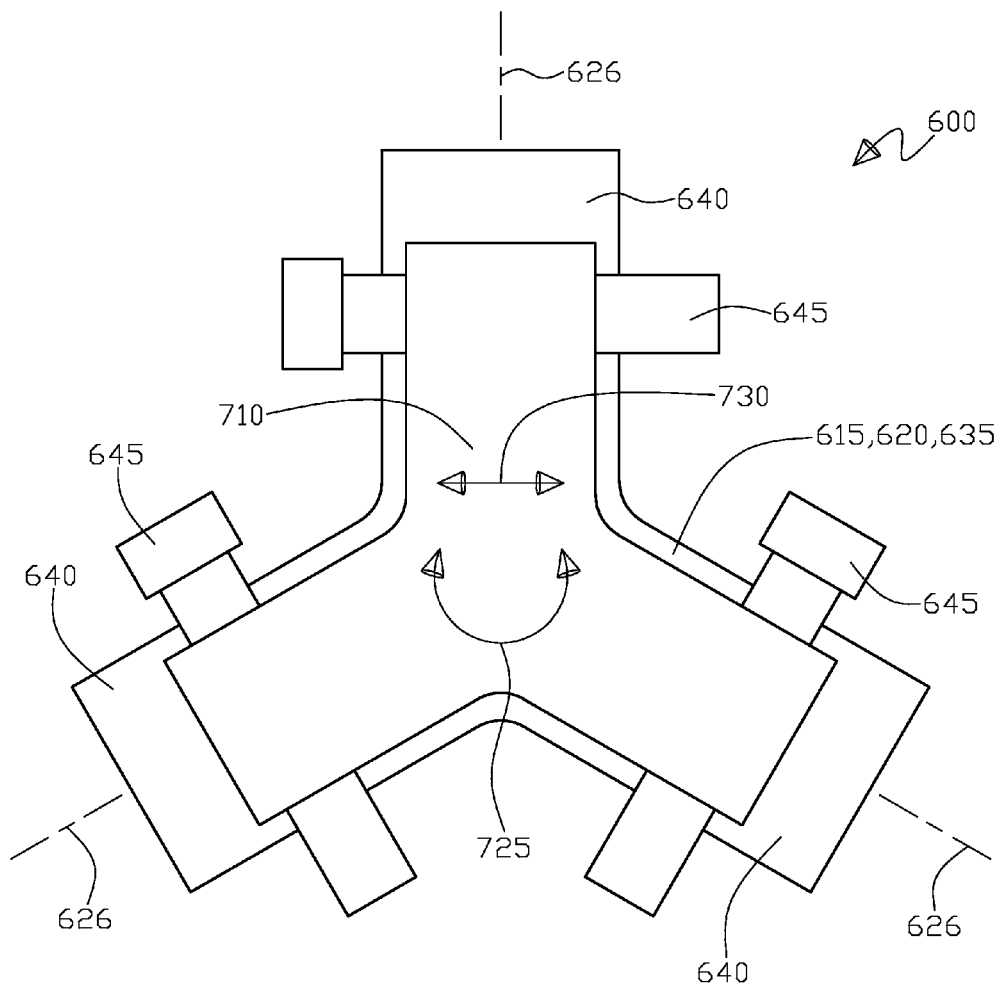
FIG. 12 shows a top view of the linear motion translating apparatus including the core, the first side of the core, the planar axis of the core, the central portion of the core, the branches, the flexible fork assemblies, the driven element plate, the high rotational rigidity about the long axis, and the high lateral rigidity in a plane parallel to the planar axis.

Further, FIG. 11 shows a side elevation view of the linear motion translating apparatus 600 including the driver first motion machine 605, the driven second motion machine 610, the core 615, the first side of the core 620, the second side of the core 625, the planar axis 626 of the core 615, the long axis 630 of the core 615, the central portion 635 of the core 615, the branches 640, the flexible fork assemblies 645, the drive element plate 705, the driven element plate 710, the axial force 715, the equal and opposite movement 720, the high rotational rigidity 725 about the long axis 630, and the high lateral rigidity 730 in a plane parallel to the planar axis 626. Next, FIG. 12 shows a top view of the linear motion translating apparatus 600 including the core 615, the first side 620 of the core 615, the planar axis 626 of the core 615, the central portion 635 of the core 615, the branches 640, the flexible fork assemblies 645, the driven element plate 710, the high rotational rigidity 725 about the long axis 630, and the high lateral rigidity 730 in a plane parallel to the planar axis 626.

Figure 13:
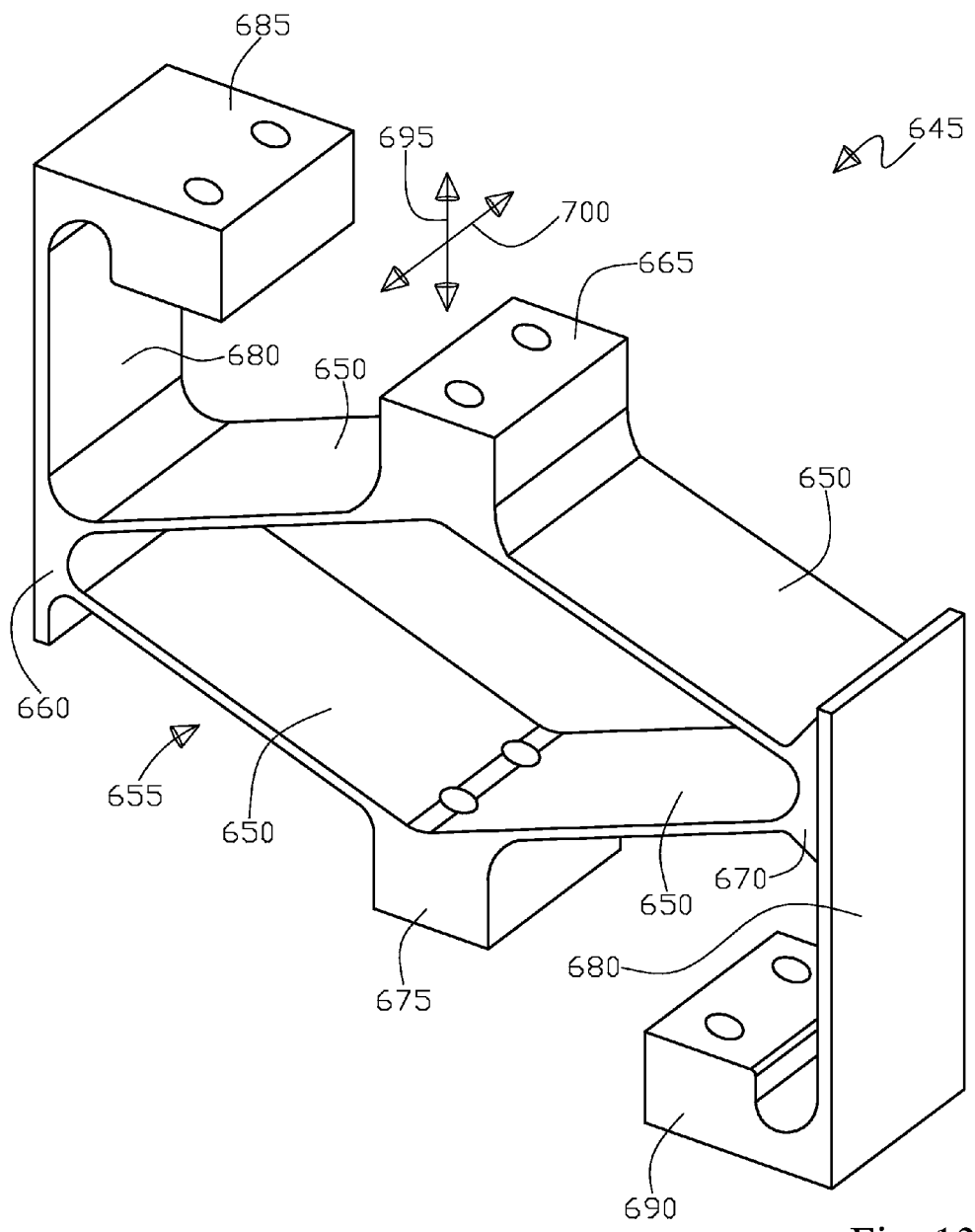
FIG. 13 shows a perspective view of the flexible fork assembly isolated from the linear rotary motion translating apparatus, with the flexible fork assembly including the flexible elements, the parallelogram formed from the flexible elements, the outer point A of the parallelogram, the outer point B of the parallelogram, the outer point C of the parallelogram, the outer point D of the parallelogram, the flexible extensions, the first side termination or the flexible extension, the second side termination of the flexible extension, the high flexibility plane, and the high rigidity plane.

Continuing, FIG. 13 shows a perspective view of the flexible fork assembly 645 isolated from the linear rotary motion translating apparatus 600, with the flexible fork assembly 645 including the flexible elements 650, the parallelogram 655 formed from the flexible elements 650, the outer point A 660 of the parallelogram 655, the outer point B 665 of the parallelogram 655, the outer point C 670 of the parallelogram 655, the outer point D 675 of the parallelogram 655, the flexible extensions 680, the first side termination 685 or the flexible extension 680, the second side termination 690 of the flexible extension 680, the high flexibility plane 695, and the high rigidity plane 700. Next, FIG. 14 shows a perspective view of the linear rotary motion translating apparatus 600 that utilizes the first 120 and second 230 side flexible finger assemblies in place of the flexible fork assemblies 645, also shown is the core 615, the first side 620 of the core 615, the second side 625 of the core 615, the planar axis 626 of the core 615, the long axis 630 of the core 615, the central portion 635 of the core 615, the branches 640, the drive element plate 705, the driven element plate 710, the axial force 715, the equal and opposite movement 720, the high rotational axis rigidity 725 about the long axis 630, and the high lateral rigidity 730 in a plane parallel to the planar axis 626.

Figure 14:
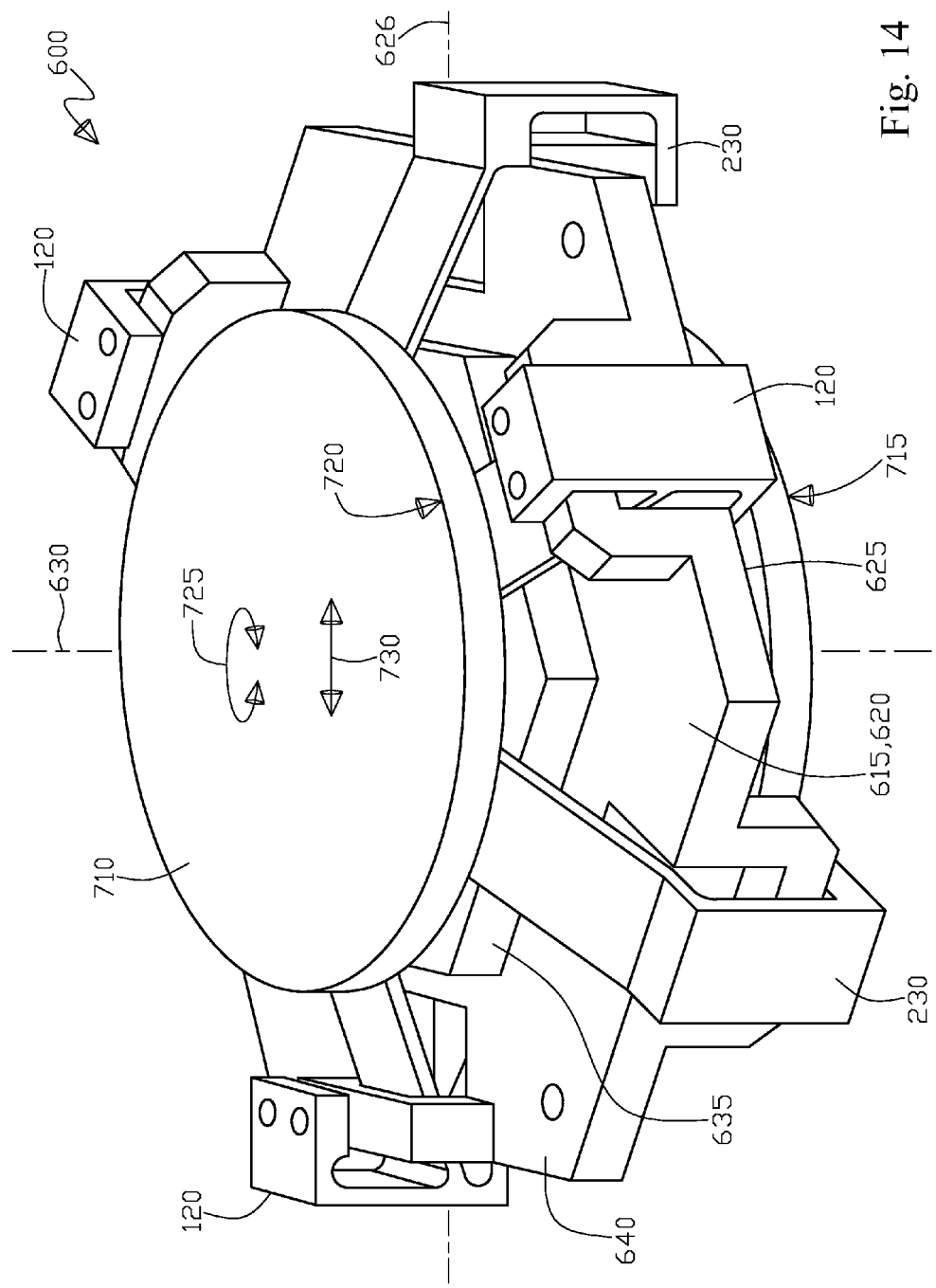
FIG. 14 shows a perspective view of the linear rotary motion translating apparatus that utilizes the first and second side flexible finger assemblies in place of the flexible fork assemblies, also shown is the core, the first side of the core, the second side of the core, the planar axis of the core, the long axis of the core, the central portion of the core, the branches, the drive element plate, the driven element plate, the axial force, the equal and opposite movement, the high rotational axis rigidity about the long axis, and the high lateral rigidity in a plane parallel to the planar axis.
Figure 15:
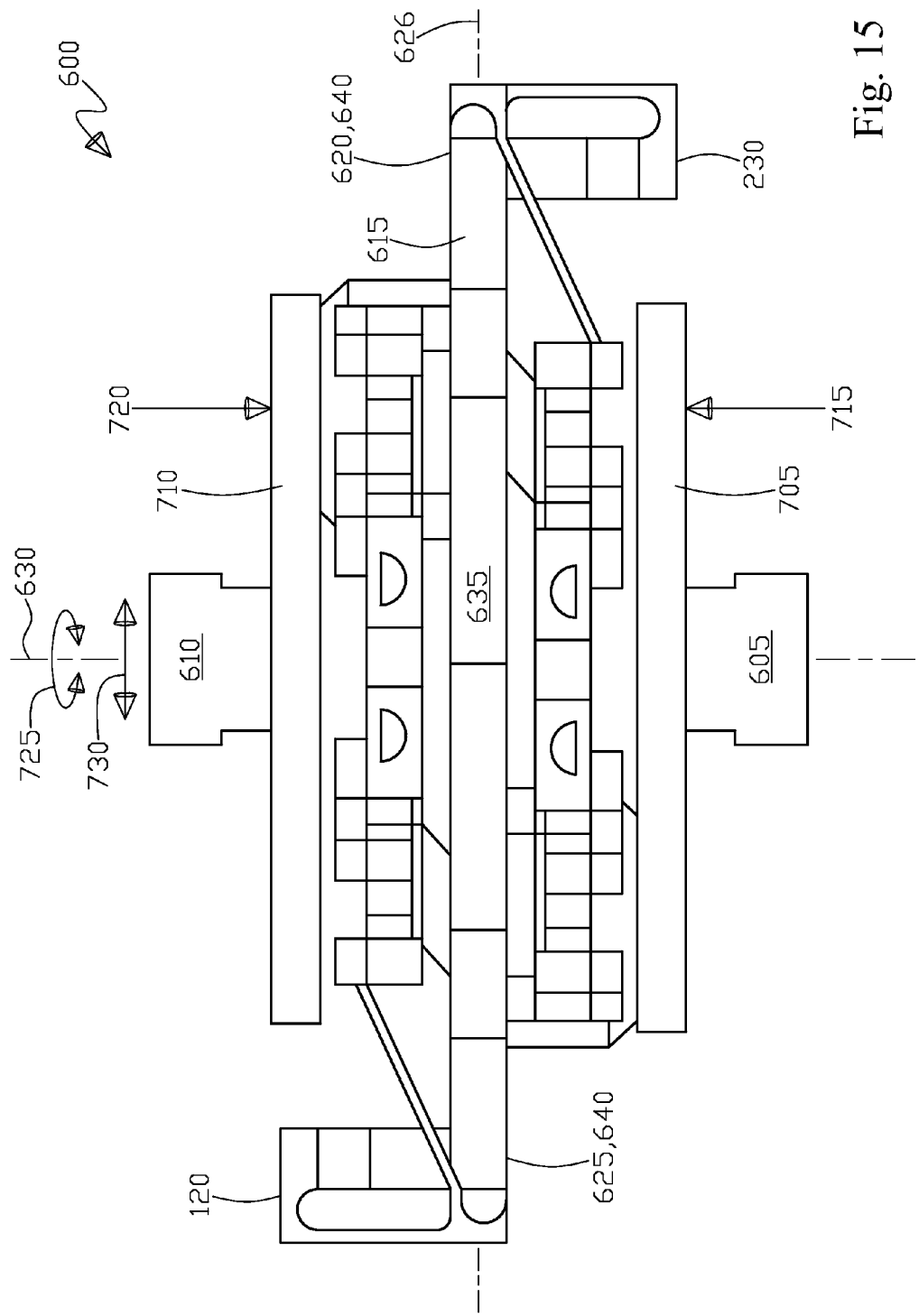
FIG. 15 is a side elevation view of the linear rotary motion translating apparatus as shown in FIG. 14, with the driver first motion machine shown, the driven second motion machine, the core, the first side of the core, the second side of the core, the planar axis of the core, the long axis of the core, the central portion of the core, the branches, the first side flexible finger assemblies, the second side flexible finger assemblies, the drive element plate, the driven element plate, the axial force, the equal and opposite movement, the high rotational axis rigidity about the long axis, and the high lateral rigidity in a plane parallel to the planar axis.

Further, FIG. 15 is a side elevation view of the linear rotary motion translating apparatus 600 as shown in FIG. 14, with the driver first motion machine 605 shown, the driven second motion machine 610, the core 615, the first side 620 of the core 615, the second side 625 of the core 615, the planar axis 626 of the core 615, the long axis 630 of the core 615, the central portion 635 of the core 615, the branches 640, the first side flexible finger assemblies 120, the second side flexible finger assemblies 230, the drive element plate 705, the driven element plate 710, the axial force 715, the equal and opposite movement 720, the high rotational axis rigidity 725 about the long axis 630, and the high lateral rigidity 730 in a plane parallel to the planar axis 626.

Broadly, the present invention of the flexure support apparatus 50 is for providing multiple axes 310, 315, 355, 360, support to reciprocating members 275, 325 for an energy conversion process 465, 470, as best shown in FIGS. 1, 2, 5 and 6. The flexure support apparatus 50 includes the base 55 having a first side 60 and a second side 65, the base 55 having a planar axis 70, the base also having a longitudinal axis 75 that is positioned perpendicular to the planar axis 70, with the base 55 having an outer periphery portion 80 that is positioned about the longitudinal axis 75, see FIGS. 1, 2, and 4. Further included is a sleeved opening 95 positioned therethrough the base 55 located in a central portion 90 of the base 55, wherein the sleeved opening 95 is about the longitudinal axis 75, also the sleeved opening 95 extends beyond the base 55 along the longitudinal axis 75 having a first side sleeve extension 100 and a second side sleeve extension 105, see FIGS. 5 and 6. Also, the base 55 has a plurality of first side apertures 110 and a plurality of second side apertures 115 that are both disposed therethrough the base 55, positioned in an intermediate portion 85 of the base 55, wherein the intermediate portion 85 is located between the outer periphery portion 80 and the central portion 90, as best shown in FIGS. 1 and 4.

Further included in the flexure support apparatus 50 is a plurality of first side flexible finger assemblies 120, each first side flexible finger assembly 120 having a pair of first side flexible tines 125 extending from a first side common origin 140 in a cantilever fashion 145 to a first side primary free end 130 and a first side secondary free end 135 and a first side flexible arm 185 extending from the first side common origin 140 to being affixed 190 to the base 55 first side 60 outer periphery portion 80, see in particular FIG. 7, also FIGS. 1 and 2. Also included in the flexure support apparatus 50 is a plurality of second side flexible finger assemblies 230, each second side flexible finger assembly 230 having a pair of second side flexible tines 235 extending from a second side common origin 250 in a cantilever fashion 255 to a second side primary free end 240 and a second side secondary free end 245 and a second side flexible arm 260 extending from the second side common origin 250 to being affixed 265 to the base 55 second side 65 outer periphery portion 80, see in particular FIG. 7, also FIGS. 2 and 4. Wherein, the second side flexible arm 260 is positioned on the base 55 in an offset manner 270 along the outer periphery 80 in relation to the first side flexible arm 185 position on the base 55, see FIG. 1.

Also, included in the flexure support apparatus 50 is a first side piston assembly 275 having a first side lengthwise axis 280, the first side piston assembly 275 having a first side work end portion 285 and an opposing first side support portion 290, the first side work end portion 285 has a first slip fit clearance 300 engagement within the first side sleeve extension 100, wherein the first side lengthwise axis 280 and the longitudinal axis 75 are co-axial, thus facilitating that the first side work portion 285 operating with a close but non-contacting clearance 300 which is preferred to operate without a dynamic seal within clearance 300 due to the high rigidity 315 of the first 120 and second 230 flexible finger assemblies, see FIGS. 5 and 6. The first side support portion 290 is affixed 305 to the first side primary free ends 130 of the plurality of first side flexible finger assemblies 120, see FIGS. 1, 2, 5, and 6. Wherein operationally, the plurality of first side flexible finger assemblies 120 facilitate rigidity 310 of the first side piston assembly 275 about the first side lengthwise axis 280 and facilitate rigidity 315 against movement in a plane parallel to the planar axis 70, while allowing the first side piston assembly 275 reciprocative movement 320, 465 within the first side sleeve extension 100 along the first side lengthwise axis 280, see FIGS. 1, 5, and 6.

In addition, included in the flexure support apparatus 50 is a second side piston assembly 325 having a second side lengthwise axis 330, the second side piston assembly 325 having a second side work end portion 335 and an opposing second side support portion 340, the second side work end portion 335 has a second slip fit clearance engagement 345 within the second side sleeve extension 105, wherein the second side lengthwise axis 330 and the longitudinal axis 75 are co-axial. The second side support portion 340 is affixed 350 to the second side primary free ends 240 of the plurality of second side flexible finger assemblies 230. As with the first side work portion 285, the second side work portion 335 is preferred to operate without a dynamic seal within clearance 345 due to the high rigidity 360 of the first 120 and second 230 flexible finger assemblies, to facilitate close but non-contacting surfaces in clearance 345, see FIGS. 5 and 6. Wherein operationally the plurality of second side flexible finger assemblies 230 facilitate rigidity in movement 355 of the second side piston assembly 325 about the second side lengthwise axis 330 and facilitate rigidity against movement 360 in a plane parallel to the planar axis 70, while allowing the second side piston assembly 325 reciprocative movement 365 within the second side sleeve extension 105 along the second side lengthwise axis 330, see FIGS. 5 and 6.

Also, for the flexure support apparatus 50 included is a plurality of first side legs 370 each having a first side leg proximal end portion 375 and an opposing first side leg distal end portion 380, each of the first side leg proximal end portions 375 is affixed 385 to the first side support portion 290 of the first side piston assembly 275, each first side leg 370 freely 390 extends therethrough each of the first side apertures 110 in the base 55, see FIGS. 1 and 4. Wherein each first side leg distal end portion 380 is affixed 395 to each second side secondary free end 245 of the plurality of second side flexible finger assemblies 230, see FIGS. 1, 2, 4, 5, and 6.

In addition, for the flexure support apparatus 50 included is a plurality of second side legs 405 each having a second side leg proximal end portion 410 and an opposing second side leg distal end portion 415, each of the second side leg proximal end portions 410 is affixed 420 to the second side support portion 340 of the second side piston assembly 325, each second side leg 405 freely 425 extends therethrough each of the second side apertures 115 in the base 55, see FIGS. 1, 4, 5, and 6. Wherein each second side leg distal end portion 415 is affixed 430 to each of the first side secondary free end 135 of the plurality of first side flexible finger assemblies 120, again see FIGS. 1, 4, 5, and 6, noting that for FIGS. 5 and 6, the first 370 and second 405 side legs are angled for visual clarity as compared to the first 370 and second 405 side legs appearing straight in FIGS. 1, 2, 4, and 8.

Wherein operationally when force movement 440 is imparted into either one of the first 290 or second 340 side support portions of the first 275 or second 325 side piston assemblies, see in particular FIG. 5, and wherein the force movement 440 is along the longitudinal axis 75 toward the base 55, the first side primary free ends 130 and the first side secondary free ends 135 move toward 445 one another ultimately causing the first side common origin 140 to move 450 toward the outer periphery portion 80, as do the second side primary free ends 240 and the second side secondary free ends 245 move 455 toward one another ultimately causing the second side common origin 250 to move 460 toward the outer periphery portion 80, see especially going from FIGS. 5 to 6. Which ultimately results in the first 275 and second 325 side piston assemblies moving toward or apart from one another in unison resulting in cancelling a mechanical and dynamic disturbance from the first 275 and second 325 side piston assemblies having opposing reciprocative movement 465, with the first 285 and second 335 side piston work end portions applying compressive work energy 470 to a fluid within the sleeve 95, see again FIGS. 5 and 6.

Further, on the flexure support apparatus 50 for the plurality of first 120 and second 230 side flexible finger assemblies the first 125 and second 235 side tines preferably have tine cross sections 150, that have a tine larger dimension 155 in a large tine plane 160 that is parallel to the planar axis 70 and a tine dimension that is smaller 165 than the larger tine dimension 155 in a small tine plane 170 parallel to the longitudinal axis 75, see in particular FIG. 7. Wherein, operationally this is to facilitate high flexibility 175 in tine 125, 235 movement parallel to the longitudinal axis 75 and to have high rigidity 180 in tine 125, 235 movement parallel to the planar axis 70 to enhance the rotational rigidity 310, 355 and the lateral rigidity 315, 360, as best shown in FIGS. 5 and 6.

In addition, for the flexure support apparatus 50 on the plurality of first 120 and second 230 side flexible finger assemblies first 185 and second 260 side arms have arm cross sections 195 that an arm larger dimension 200 in a large arm plane 205 that is parallel to the planar axis 70 and is about the longitudinal axis 75, and an arm dimension 210 that is smaller that the larger arm dimension 200 in a small arm plane 215 that is parallel to the planar axis 70 going from the central portion 90 to the outer periphery 80 portion, again best shown in FIG. 7. Wherein, operationally this is to facilitate high flexibility 220 in arm 185, 260 movement parallel to the planar axis 70 between the central portion 90 and the outer periphery portion 80 and to have high rigidity 225 in arm 185, 260 movement parallel to the planar axis 70 and about the longitudinal axis 75 to further enhance the rotational rigidity 310, 355 and the lateral rigidity 315, 360, as best shown in FIGS. 5 and 6.

Yet further on the flexure support apparatus 50 on each of the first side leg 370 distal end portion 380 extends beyond 400 the first side work end portion 285 of the first side piston assembly 275 along the longitudinal axis 75 towards the second side support portion 340 of the second side piston assembly 325 and each second side leg 405 distal end portion 415 extends beyond 435 the second side work end portion 335 of the second side piston assembly 325 along the longitudinal axis 75 towards the first side support portion 290 of the first side piston assembly 275 to operationally add rigidity to the first 275 and second 325 side piston assemblies in an axis parallel to the planar axis 70 to maintain the first 300 and second 345 slip fit clearance engagements, as best shown in FIGS. 5 and 6, also see FIGS. 1 and 4. Looking at particular to FIGS. 5 and 6, the benefit of the extensions 400, 435 is to decrease the moment that exists at the first 290 and second 340, wherein this moment could cause added movement at 315, 360 if it were increased, however, with the extensions 400, 435 the moment at the first 290 and second 340 supports is reduced as the undesirable "cantilever effect" that would exist at the first 285 and second 335 work portions respectively in relation to the first 290 and second 340 support portions via providing support beyond 400, 435 the first 285 and second 335 work portions greatly adds rigidity to movement 315, 360.

In addition, for the flexure support apparatus 50 it is preferred that at least three of each of the first 120 and second 230 side flexible finger assemblies are used for enhanced rigidity 310, 315, 355, 360 of the first 275 and second 325 side piston assemblies about the longitudinal axis 75 and parallel to the planar axis 70, as best shown in FIGS. 1, 2, and 3.

Broadly for the linear rotary motion translating apparatus 600 that is for providing a coupling link as between a driver first motion machine 605 and driven second motion machine 610, the linear rotary motion translating apparatus 600 includes a core structure 615 having a first side 620 and a second side 625, with the core structure 615 having a planar axis 626, the core 615 also having a long axis 630 that is positioned perpendicular to the planar axis 626, the core structure 615 having a central portion 635 that is about the long axis 630, also the core structure 615 having a plurality of branches 640 extending outward from the central portion 635, as best shown in FIGS. 12, 14, and 15.

Also included for the linear rotary motion translating apparatus 600 is a plurality of flexible fork assemblies 645, each flexible fork assembly 645 having flexible elements 650 that form a parallelogram 655, the parallelogram 655 having an outer point A 660, an outer point B 665, an outer point C 670, and an outer point D 675, wherein outer points A 660 and C 670 oppose one another and outer points B 665 and D 675 oppose one another, wherein the outer points A 660 and C 670 have equal and opposite flexible extensions 680 that terminate as a pair cantilever beams in a first side termination 685 and a second side termination 690, see FIG. 13 in particular. Wherein each first side termination 685 is attached to each of the branches 640 on the first side 620 and each second side termination 690 is attached to each of the branches 640 on the second side 625, also see FIG. 13. Further, each flexible fork assembly 645 is sized and configured to have high flexibility 695 as between said outer points A 660, B 665, C 670, and D 675, also as between the first 685 and second 690 side terminations all relative to one another forming a high flexibility plane 695 and conversely to have high rigidity 700 as between the outer points A 660, B 665, C 670, and D 675, also as between the first 685 and second 690 side terminations all relative to one another forming a high rigidity plane 700 that is perpendicular to the high flexibility plane 695.

In addition, included for the linear rotary motion translating apparatus 600 is a drive element plate 705 that is adapted to attach to the driver first motion machine 605, the drive element plate 705 is attached to the outer point B 665 of each of the plurality of flexible fork assemblies 645. Also, included is a driven element plate 710 that is adapted to attach to the driven second motion machine 610, the driven element plate 710 is attached to the outer point D 675 of each of the plurality of flexible fork assemblies 645, see FIGS. 11 and 12. Wherein operationally an axial force 715 causing movement along the long axis 630 imparted into the drive element plate 705 causes an equal and opposite movement in the driven element plate 710, wherein high rigidity 725 exists as between the drive element plate 705 and the driven element plate 710 in a rotational axis about the long axis 630 and high rigidity exists 730 as between the drive element plate 705 and the driven element plate 710 in a plane parallel to the planar axis 626, as best shown in FIGS. 11, 12, and 13.

Further in looking at FIGS. 14 and 15 for the linear rotary motion translating apparatus 600 including the core structure 615 as previously described can utilize the first side flexible finger 120 and second side flexible finger 230 assemblies also as previously described in lieu of the flexible fork assemblies 645 also as previously described. Thus, for the plurality of first side flexible finger assemblies 120, each first side flexible finger assembly 120 having the pair of first side flexible tines 125 extending from the first side common origin 140 in the cantilever fashion 145 to the first side primary free end 130 and the first side secondary free end 135, and the first side flexible arm 185 extending from the first side common origin 140 to being affixed to an alternating of each of the core structure 615 plurality of branches 640.

In addition for FIGS. 14 and 15, the plurality of second side flexible finger assemblies 230, each second side flexible finger assembly 230 having the pair of second side flexible tines 235 extending from the second side common origin 250 in the cantilever fashion 255 to the second side primary free end 240, and the second side secondary free end 245 and the second side flexible arm 260 extending from the second side common origin 250 to being affixed to an opposing alternating of each core structure 615 plurality of branches 640 in relation to the plurality of first side flexible finger assemblies 120, see in particular FIG. 14.

Also in looking at FIGS. 14 and 15, the drive element plate 705 that is adapted to attach to the driver first motion machine 605, wherein the drive element plate 705 is attached to the first side primary free end 130 of each of the plurality of first side flexible finger assemblies 120 and the drive element plate 705 is also attached to the second side secondary free end 245 of each of the plurality of second side flexible finger assemblies 230.

Further in FIGS. 14 and 15 the driven element plate 710 that is adapted to attach to the driven second motion machine 610, wherein the driven element plate 710 is attached to the first side secondary free end 135 of each of the plurality of first side flexible finger assemblies 120 and the driven element plate 710 is also attached to the second side primary free end 240 of each of the plurality of second side flexible finger assemblies 230. Wherein operationally, the axial force 715 causing movement along the long axis 630 is imparted into the drive element plate 705 that causes an equal and opposite movement 720 in the driven element plate 710, wherein high rigidity 725 exists as between the drive element plate 705 and the driven element plate 710 in a rotational axis about the long axis 630 and high rigidity 730 exists as between the drive element plate 705 and the driven element plate 710 in a plane parallel to the planar axis 626.

In addition, on the linear rotary motion translating apparatus 600, the plurality of first 120 and second 230 side flexible finger assemblies the first 125 and second 235 side tines preferably have tine cross sections 150, that have the tine larger dimension 155 in the large tine plane 160 that is parallel to the planar axis 626 and the tine dimension that is smaller 165 than the larger tine dimension 155 in the small tine plane 170 parallel to the long axis 630, see in particular FIG. 7, plus FIGS. 14 and 15. Wherein operationally, this is to facilitate high flexibility 175 in tine 125, 235 movement parallel to the long axis 630 and to have high rigidity 180 in tine 125, 235 movement parallel to the planar axis 626 to enhance rotational rigidity 725 and the lateral rigidity 730, as shown in FIGS. 14 and 15.

Further, for the linear rotary motion translating apparatus 600, the plurality of first 120 and second 230 side flexible finger assemblies first 185 and second 260 side arms have arm cross sections 195 that the arm larger dimension 200 in a large arm plane 205 that is parallel to the planar axis 626 and is about the long axis 630, and the arm dimension 210 that is smaller that the larger arm dimension 200 in the small arm plane 215 that is parallel to the planar axis 626 going from the central portion 635 outward past the plurality of branches 640. Wherein operationally, to facilitate high flexibility 220 in arm 185, 260 movement parallel to the planar axis 626 from the central portion 625 outward past the plurality of branches 640, to have high rigidity 730 in movement parallel to the planar axis 626 and rigidity 725 rotationally about the long axis 630 as between the drive 705 and driven 710 element plates, see in particular FIG. 7, plus FIGS. 14 and 15.

CONCLUSION

Accordingly, the present invention of a flexure support apparatus has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein. As this is a divisional patent application based on the USPTO Office Action dated Oct. 28, 2014 for patent application Ser. No. 13/671,562 requiring restriction, whereas Species 1 was originally elected that covered FIGS. 1-7 for the Flexure Support Apparatus, this divisional patent application covers Species 4 for FIGS. 14-15 for the Linear Motion Translating Apparatus with Flexible Fingers and different configuration of components from the above referenced USPTO Office Action.

The invention claimed is:

1. A linear rotary motion translating apparatus for providing a coupling link as between a driver first motion machine and driven second motion machine, said linear rotary motion translating apparatus comprising:
   (a) a core structure having a first side and a second side, said core structure having a planar axis, said core also having a long axis that is positioned perpendicular to said planar axis, said core structure having a central portion that is about said long axis, also said core structure having a plurality of branches extending outward from said central portion;
   (b) a plurality of first side flexible finger assemblies, each said first side flexible finger assembly having a pair of first side flexible tines extending from a first side common origin in a cantilever fashion to a first side primary free end and a first side secondary free end and a first side flexible arm extending from said first side common origin to being affixed to an alternating of each of said core structure plurality of branches;
   (c) a plurality of second side flexible finger assemblies, each said second side flexible finger assembly having a pair of second side flexible tines extending from a second side common origin in a cantilever fashion to a second side primary free end and a second side secondary free end and a second side flexible arm extending from said second side common origin to being affixed to an opposing alternating of each said core structure plurality of branches in relation to said plurality of first side flexible finger assemblies;
   (c) a drive element plate that is adapted to attach to the driver first motion machine, said drive element plate is attached to said first side primary free end of each of said plurality of first side flexible finger assemblies and said drive element plate is attached to said second side secondary free end of each of said plurality of second side flexible finger assemblies; and
   (d) a driven element plate that is adapted to attach to the driven second motion machine, said driven element plate is attached to said first side secondary free end of each of said plurality of first side flexible finger assemblies and said driven element plate is attached to said second side primary free end of each of said plurality of second side flexible finger assemblies, wherein operationally an axial force causing movement along said long axis imparted into said drive element plate causes an equal and opposite movement in said driven element plate, wherein high rigidity exists as between said drive element plate and said driven element plate in a rotational axis about said long axis and high rigidity exists as between said drive element plate and said driven element plate in a plane parallel to said planar axis.

2. A linear rotary motion translating apparatus according to claim 1 wherein said plurality of first and second side flexible finger assemblies first and second side tines have tine cross sections that have a tine larger dimension in a large tine plane that is parallel to said planar axis and a tine dimension that is smaller than said larger tine dimension in a small tine plane parallel to said long axis, wherein operationally to facilitate high flexibility in tine movement parallel to said long axis and to have high rigidity in tine movement parallel to said planar axis.

3. A linear rotary motion translating apparatus according to claim 1 wherein said plurality of first and second side flexible finger assemblies first and second side arms have arm cross sections that an arm larger dimension in a large arm plane that is parallel to said planar axis and is about said long axis, and an arm dimension that is smaller that said larger arm dimension in a small arm plane that is parallel to said planar axis going from said central portion outward past said plurality of branches, wherein operationally to facilitate high flexibility in arm movement parallel to said planar axis from said central portion outward past said plurality of branches, and to have high rigidity in movement parallel to said planar axis and about said long axis as between said drive and driven element plates.

* * * * *